(12) United States Patent
Wen et al.

(10) Patent No.: US 12,469,494 B1
(45) Date of Patent: Nov. 11, 2025

(54) DIALOGUE SYSTEM AND A DIALOGUE METHOD

(71) Applicant: PolyAI Limited, London (GB)

(72) Inventors: Tsung-Hsien Wen, London (GB); Andrew David Lyell, London (GB); Benjamin Peter Levin, London (GB); Camille Françoise J. Pirali, London (GB); Ho Man Yau, London (GB); Devidas Dilip Desai, London (GB); Eshan Singhal, London (GB); Ivan Vulić, London (GB); Jack Matthew Chalmers Fishwick, London (GB); Qian Zheng, London (GB); Pei-Hao Su, London (GB); Nikola Mrkšić, London (GB)

(73) Assignee: PolyAI Limited, London (GB)

( * ) Notice: Subject to any disclaimer, the term of this patent is extended or adjusted under 35 U.S.C. 154(b) by 0 days.

(21) Appl. No.: 18/793,605

(22) Filed: Aug. 2, 2024

(51) Int. Cl.
G10L 15/22 (2006.01)

(52) U.S. Cl.
CPC .................... G10L 15/22 (2013.01)

(58) Field of Classification Search
None
See application file for complete search history.

(56) References Cited

U.S. PATENT DOCUMENTS 10,664,527 B1 * 5/2020 Henderson .......... G06F 16/3347
11,132,988 B1 * 9/2021 Steedman Henderson ..................
G10L 15/22
(Continued)

OTHER PUBLICATIONS

Wu Y, Yue T, Zhang S, Wang C, Wu Q. StateFlow: Enhancing LLM Task-Solving through State-Driven Workflows. arXiv preprint arXiv:2403.11322. Mar. 17, 2024. (Year: 2024).*

(Continued)

Primary Examiner — Jonathan C Kim
(74) Attorney, Agent, or Firm — Pillsbury Winthrop Shaw Pittman LLP

(57) ABSTRACT

A computer-implemented method of controlling an output from a dialogue system, the method comprising:
receiving, by way of an input, first input data relating to speech or text provided by a user;
selecting a first state from a plurality of states of a deterministic model, at least some states of the plurality of states being associated with a corresponding portion of a language model prompt including an instruction to call a corresponding function;
responsive to the first state being associated with a corresponding portion, generating a first language model prompt comprising at least part of the corresponding portion associated with the selected first state;
providing the first language model prompt as input to a language model to generate a first language model output;
determining whether to execute a function based on the first language model output;
responsive to determining to execute a first function based on the first language model output, executing the determined first function to generate a first function output;
selecting a second state from the plurality of states based on the first function output;
responsive to the second state being associated with a corresponding portion of a language model prompt, generating a second language model prompt comprising at least part of the corresponding portion associated with the selected second state;
providing the second language model prompt as input to the language model to generate a second language model output;

(Continued)

determining whether to provide an output to the user based on the second language model output; and
responsive to determining to provide an output to the user based on the second language model output, outputting, by way of an output, speech or text to the user.

22 Claims, 14 Drawing Sheets

(56) References Cited

U.S. PATENT DOCUMENTS

| | | | |
|---|---|---|---|
| 11,210,306 | B2 | 12/2021 | Steedman Henderson et al. |
| 11,430,446 | B1* | 8/2022 | Wen .................. H04L 51/02 |
| 11,537,661 | B2 | 12/2022 | Coope et al. |
| 11,741,109 | B2* | 8/2023 | Vulic .................. G06F 16/243 707/723 |
| 11,861,521 | B2 | 1/2024 | Spithourakis et al. |
| 11,908,476 | B1* | 2/2024 | Lyu .................. G06F 3/167 |
| 12,061,636 | B1* | 8/2024 | Wen .................. G06F 16/3329 |
| 2020/0152182 | A1* | 5/2020 | Steedman Henderson .................. G06F 40/30 |
| 2020/0152184 | A1* | 5/2020 | Steedman Henderson .................. G10L 15/1822 |
| 2021/0141798 | A1* | 5/2021 | Steedman Henderson .................. G06F 16/3344 |
| 2021/0141799 | A1* | 5/2021 | Steedman Henderson .................. G06N 3/045 |
| 2022/0107979 | A1* | 4/2022 | Coope .................. G10L 15/22 |
| 2023/0135179 | A1* | 5/2023 | Mielke .................. G06N 5/022 704/232 |
| 2023/0196151 | A1* | 6/2023 | Spithourakis .......... G10L 17/22 706/4 |
| 2023/0259714 | A1* | 8/2023 | Lange .................. G06F 40/237 704/9 |
| 2023/0395075 | A1* | 12/2023 | Li .................. G10L 15/1815 |
| 2024/0028838 | A1* | 1/2024 | Compton .............. G06F 40/40 |
| 2024/0249318 | A1* | 7/2024 | Spiegel .................. H04L 51/02 |
| 2024/0282298 | A1* | 8/2024 | Koneru .................. G10L 15/183 |
| 2024/0354068 | A1* | 10/2024 | Silva .................. G06F 8/33 |
| 2024/0370505 | A1* | 11/2024 | Devaux .............. G06F 16/3338 |

OTHER PUBLICATIONS

Long J. Large language model guided tree-of-thought. arXiv preprint arXiv:2305.08291. May 15, 2023. (Year: 2023).*
Yao S, Yu D, Zhao J, Shafran I, Griffiths T, Cao Y, Narasimhan K. Tree of thoughts: Deliberate problem solving with large language models. Advances in Neural Information Processing Systems. Feb. 13, 2024;36. (Year: 2024).*
Zhang Z, Yao Y, Zhang A, Tang X, Ma X, He Z, Wang Y, Gerstein M, Wang R, Liu G, Zhao H. Igniting Language Intelligence: The Hitchhiker's Guide From Chain-of-Thought Reasoning to Language Agents. arXiv preprint arXiv:2311.11797. Nov. 20, 2023. (Year: 2023).*
Liu J, Shuai J. Smot: Think in State Machine. arXiv preprint arXiv:2312.17445. Dec. 29, 2023. (Year: 2023).*
"A practitioners guide to retrieval augmented generation (RAG)," Deep Learning Focus, available at <https://cameronrwolfe.substack.com/p/a-practitioners-guide-to-retrieval> retrieved Dec. 17, 2024, pp. 1-34.
"Retrieval-Augmented Generation for Knowledge-Intensive NLP Tasks," Cornell University, Computer Science > Computation and Language, available at <https://arxiv.org/abs/2005.11401> dated Apr. 12, 2021, pp. 1-19.
"REALM: Retrieval-Augmented Language Model Pre-Training," Cornell University, Computer Science > Computation and Language, available at <https://arxiv.org/abs/2002.08909> dated Feb. 10, 2020, pp. 1-12.
"What is retrieval-augmented generation, aka RAG?" NVIDIA, available at <https://blogs.nvidia.com/blog/what-is-retrieval-augmented-generation/> retrieved Dec. 17, 2024, pp. 1-12.
"Retrieval-Augmented Generation for Large Language Models: A Survey," Cornell University, Computer Science > Computation and Language, available at <https://arxiv.org/abs/2312.10997> dated Mar. 27, 2024, pp. 1-21.
"Retrieval augmented generation (RAG)," Cohere Docs, Text Generation, available at <https://cohere.com/blog/chat-with-rag> retrieved Dec. 17, 2024, 1 page.
"Introducing chat with retrieval-augmented generation (RAG)," Cohere, available at <https://cohere.com/blog/chat-with-rag> retrieved Dec. 17, 2024, pp. 1-8.
"How do domain-specific chatbots work? An overview of retrieval augmented generation (RAG)," Scriv, available at <https://scriv.ai/guides/retrieval-augmented-generation-overview/> retrieved Dec. 17, 2024, pp. 1-18.
"NVIDIA Riva—Models," NVIDIA, available at <https://docs.nvidia.com/deeplearning/riva/user-guide/docs/reference/models/index.html> dated Dec. 12, 2024, 1 page.
"Enhancing phone customer service with ASR customization," NVIDIA Developer, available at <https://developer.nvidia.com/blog/enhancing-phone-customer-service-with-asr-customization/> retrieved Dec. 17, 2024, pp. 1-10.
"Can ChatGPT Detect Intent? Evaluating Large Language Models for Spoken Language Understanding," Cornell University, Computer Science > Computation and Language, available at <https://arxiv.org/abs/2305.13512> dated Aug. 17, 2023, pp. 1-6.
"Using LLMs for Intent Classification," Rasa Docs, available at <https://rasa.com/docs/rasa/next/llms/llm-intent/> retrieved Dec. 17, 2024, pp. 1-8.
"SQATIN—Supervised Instruction Tuning Meets Question Answering for Improved Dialogue NLU," Semantic Reader, available at <https://www.semanticscholar.org/reader/ebdb84c437068f615f9fdf703415580cbb1d2aad> dated Apr. 8, 2024, pp. 1-17.
"Pheme: Efficient and Conversational Speech Generation ," Cornell University, Electrical Engineering and Systems Science > Audio and Speech Processing, available at <https://arxiv.org/abs/2401.02839> dated Jan. 5, 2024, pp. 1-15.
"Prompt Injection," Nightfall AI, available at <https://www.nightfall.ai/ai-security-101/prompt-injection> retrieved Dec. 17, 2024, pp. 1-5.
"What is a vector database & how does it work? Use cases + examples," Pinecone, available at <https://www.pinecone.io/learn/vector-database/> retrieved Dec. 17, 2024, pp. 1-23.
"A Survey on Hallucination in Large Language Models: Principles, Taxonomy, Challenges, and Open Questions," ACM Digital Library, available at <https://doi.org/10.1145/3703155> dated Nov. 19, 2024, pp. 1-58.
"Survey of Hallucination in Natural Language Generation," Cornell University, Computer Science > Computation and Language, available at <https://arxiv.org/abs/2202.03629> dated Jul. 14, 2024, pp. 1-59.
"Function calling," OpenAI Platform, available at <https://platform.openai.com/docs/guides/function-calling> retrieved Dec. 17, 2024, pp. 1-22.
"OpenAI function calling tutorial," Datacamp, available at < https://www.datacamp.com/tutorial/open-ai-function-calling-tutorial> retrieved Dec. 17, 2024, pp. 1-18.
"Function calling: Integrate your GPT Chatbot with anything," Semaphore, available at <https://semaphoreci.com/blog/function-calling> retrieved Dec. 17, 2024, pp. 1-20.
Budzianowski et al., "PHEME: Efficient and Conversational Speech Generation," dated Jan. 5, 2024, pp. 1-15.
Li et al., "StyleTTS 2: Towards Human-Level Text-to-Speech through Style Diffusion and Adversarial Training with Large Speech Language Models," dated Nov. 20, 2023, pp. 1-28.
BehnamGhader et al., "LLM2Vec: Large Language Models Are Secretly Powerful Text Encoders," dated Aug. 21, 2024, pp. 1-28.
"Embedding Leaderboard," Hugging Face, MTEB/leaderboard, available at <https://huggingface.co/spaces/mteb/leaderboard> retrieved Dec. 17, 2024, pp. 1-3.
"Gte-large-en-v1.5," Hugging Face, Alibaba-NPL/gte-large-en-v1.5, available at <https://huggingface.co/Alibaba-NLP/gte-large-en-v1.5> retrieved Dec. 17, 2024, pp. 1-8.

(56) References Cited

OTHER PUBLICATIONS

"Gte-Qwen2-1.5B-instruct," Hugging Face, Alibaba-NPL/gte-Qwen2-1.5B-instruct, available at <https://huggingface.co/Alibaba-NLP/gte-Qwen2-1.5B-instruct> retrieved Dec. 17, 2024, pp. 1-9.

"Universal AngIE Embedding," Hugging Face, WhereIsAI/UAE-Large-V1, available at <https://huggingface.co/WhereIsAI/UAE-Large-V1> retrieved Dec. 17, 2024, pp. 1-6.

"FlagEmbedding," Hugging Face, BAAI/bge-large-en-v1.5, available at <https://huggingface.co/BAAI/bge-large-en-v1.5> retrieved Dec. 17, 2024, pp. 1-17.

"Gte-base-en-v1.5," Hugging Face, Alibaba-NLP/gte-base-en-v1.5, available at <https://huggingface.co/Alibaba-NLP/gte-base-en-v1.5> retrieved Dec. 17, 2024, pp. 1-8.

"How to use function calling with Azure OpenAI Service," Microsoft Learn, Azure—AI Services, available at <https://learn.microsoft.com/en-us/azure/ai-services/openai/how-to/function-calling> retrieved Dec. 17, 2024, pp. 1-13.

"Function calling and other API updates," Microsoft Learn, Azure—AI Services, available at <https://openai.com/index/function-calling-and-other-api-updates/> retrieved Dec. 17, 2024, pp. 1-7.

Henderson et al, "ConveRT: Efficient and Accurate Conversational Representations from Transformers," Apr. 29, 2020, pp. 1-11.

Braun et al, "Evaluating natural language understanding services for conversational question answering systems,"In Proceedings of SIGDIAL, 2017, pp. 174-185 (1-12).

\* cited by examiner

354

It is ~~an Indus~~
    Hernández

Contextual Recognition
Actually, can you make that ~~hate~~ people?
                              eight Alphanumerical Parsing
~~Apple Charlie Echo double eight 0 for 7~~
A C E 8 8 0 4 7

Ensemble of Recognizers and N-best List
~~Unfortunately, I have lost my car.~~
Unfortunately, I have lost my card.
~~Unfortunately bathrooms my car.~~

General rules
Setting taks scope and style guidance
{ You are a helpful and friendly virtual concierge helping customers over the phone for Poly Hotel. You have the following actions to choose from:
1. Book a reservation by following RESERVATION_STEPS
2. Answer customer enquiries based on RELEVANT_FACTS
3. Transfer the customer to a particular phone queue
Please stick to the following STYLE guidelines:
-Your responses should be appropriate for a phone conversation
-Your reposnses should be around 30 words, and no longer than 50 words.
-Be polite and helpful 1451 Talk Tracks
Guide LLM step-by-step to perform controllable business transactions
{ RESERVATION_STEPS
1. Check Membership
 a. Ask whether the user has a hotel membership
 b. Call check_member with a boolean user response
2. Validate Membership
 a. Ask for the 9 digit member ID on the back of their card
 b. Ask for the date of birth
 c. Call validate_member with member ID and date of birth
3. Collect Room Details
 a. Ask for the arrival date, number of nights, and party size
 b. Ask for the room preference
 c. Call check_availability and apply discount based on member ID 1452 RAG
Augment LLM with retrieved referenceable KB facts
{ RELEVANT_FACTS
-parking-self_parking: We have complimentary self-paring for registered guests at the hotel. Our self-parking garage is located on the south side of the hotel on 1st Street and Bridger.
-parking-oversized: We have some open parking for oversized vehicles on Main and East Carson Avenue, behind our main self park garage.
-parking-price-regular_rates: Parking cost for non-hotel guests without qualified parking validations, regular rate is $50 per car per day 1453 Dialog history
Provide full dialog context to LLM
{ DIALOG
Agent: Thanks for calling Poly Hotel, how can I help you today?
User: I would like to make a reservation
Agent: Sure, I can help you with that. Do you have a membership with us?
User: Yep
Agent: Great. Can you give me your membership ID, and date of birth?
User: It is 0 9 4 4 2 0 9 1 5, and 1990 June the sixth
Agent: Okay I have found your details, Mr.Smith. When will you be arriving?
User: Sure, oh, can you remind me that whether I an check-in early?
Agent:

DIALOGUE SYSTEM AND A DIALOGUE METHOD

TECHNICAL FIELD

The present disclosure relates to a dialogue system and a dialogue method.

BACKGROUND

Dialogue systems such as for example, chatbots or voice-based agents, may be designed to interact with humans (e.g., users of the dialogue systems) via voice or text-based conversations. Dialogue systems may be used in a wide variety of applications ranging from personal assistants, medical assistants, and/or the like, to providing customer service, customer support, and/or the like.

"Intent-based" dialogue systems may use intent detection and value extraction components within a natural language understanding module, where the intent detection component outputs any "intents" corresponding to input text and the value extraction component outputs any "slots" and "values" corresponding to the input text. Such systems may use handcrafted intents and entities (slots). Performance of such conversational agents can be compromised when tasks fall outside the predetermined conversational design however, for example, if the user deviates from the original conversation design. In other words, when faced with out-of-scope behaviour, the system may not be able to help the user, may ask the user to rephrase or repeat the query, or may guide the user towards conversational flows it can support.

Alternatively, dialogue systems may be based on large language models (LLMs) that comprise generative pre-trained transformer architecture. Large language models are trained on extensive datasets (e.g., text from the Internet) to perform a wide range of tasks. Accordingly, dialogue systems that incorporate large language models are able to respond to unexpected inputs from the users. However, there are several challenges associated with dialogue systems based on large language models. For example, dialogue systems based on LLMs may not allow for the dialogue system provider to have control over the conversational agent. Furthermore, large language models may be prone to "hallucinations". Put differently, large language models may be capable of producing coherent-sounding output that may be inaccurate or fabricated. This can lead to unexpected behaviour of the dialogue systems.

Accordingly, there is a need for dialogue systems that provide a measure of control over the output, whilst being robust to unexpected inputs.

SUMMARY

According to a first aspect, there is provided a computer-implemented method of controlling an output from a dialogue system, comprising:
  receiving, by way of an input, first input data relating to speech or text provided by a user;
  selecting a first state from a plurality of states of a deterministic model, at least some states of the plurality of states being associated with a corresponding portion of a language model prompt including an instruction to call a corresponding function;
  responsive to the first state being associated with a corresponding portion, generating a first language model prompt comprising at least part of the corresponding portion associated with the selected first state;
  providing the first language model prompt as input to a language model to generate a first language model output;
  determining whether to execute a function based on the first language model output;
  responsive to determining to execute a first function based on the first language model output, executing the determined first function to generate a first function output;
  selecting a second state from the plurality of states based on the first function output;
  responsive to the second state being associated with a corresponding portion of a language model prompt, generating a second language model prompt comprising at least part of the corresponding portion associated with the selected second state;
  providing the second language model prompt as input to the language model to generate a second language model output;
  determining whether to provide an output to the user based on the second language model output; and
  responsive to determining to provide an output to the user based on the second language model output, outputting, by way of an output, speech or text to the user.

In one example, the method can further comprise:
  responsive to outputting the speech or text to the user based on the second language model output, receiving, by way of the input, second input data relating to speech or text provided by the user;
  after receiving the second input data, selecting a state from the plurality of states, wherein the selected state is the second state;
  generating a third language model prompt comprising at least part of the corresponding portion associated with the selected second state;
  providing the third language model prompt as input to the language model to generate a third language model output;
  determining whether to execute a function based on the third language model output;
  responsive to determining to execute a second function based on the third language model output, executing the determined second function to generate a second function output; and
selecting a third state from the plurality of states based on the second function output.

In some cases, executing the determined second function to generate the second function output comprises executing an initial second function to generate an initial second function output, determining a third function based on the initial second function output, and executing the determined third function to generate the second function output. In some cases, the method can further comprise responsive to outputting the speech or text to the user based on the second language model output, receiving, by way of the input, second input data relating to speech or text provided by the user, and storing the first input data, the first language model output, the second language model output, and the second input data as a dialogue history with the user. The third language model prompt further comprises the dialogue history with the user.

In one example, the at least some states can further comprise information identifying the corresponding function. In such an example, executing the determined first function can further comprise verifying an argument of the first function based on the first language model output and the information identifying the corresponding function associated with the selected first state, and responsive to determining that the argument is verified, executing the determined first function to generate the first function output. In some cases, the method can further comprise responsive to determining that the argument is not verified, generating a modified first language model prompt comprising at least part of the corresponding portion associated with the selected first state and providing the modified first language model prompt as input to the language model to generate a modified first language model output.

In one example, selecting the first state can comprise applying at least one pre-determined rule to the first input data, and selecting the first state based on the application of the at least one pre-determined rule.

In one example, the method can further comprise:
responsive to outputting the speech or text to the user based on the second language model output, receiving, by way of the input, second input data relating to speech or text provided by the user;
after receiving the second input data, selecting a state from the plurality of states, wherein the selected state is the second state;
generating a third language model prompt comprising at least part of the corresponding portion associated with the selected second state;
providing the third language model prompt as input to the language model to generate a third language model output;
determining whether to execute a function based on the third language model output;
responsive to determining to execute a second function based on the third language model output, executing the determined second function to generate a second function output;
selecting the second state from the plurality of states based on the second function output;
generating a fourth language model prompt comprising at least part of the corresponding portion associated with the selected second state; and
providing the fourth language model prompt to the language model to generate a fourth language model output.

In one example, the method can further comprise:
responsive to outputting the speech or text to the user based on the second language model output, receiving, by way of input, second input data relating to speech or text provided by the user;
after receiving the second input data, selecting a state from the plurality of states, wherein the selected state is the second state;
generating a third language model prompt comprising at least part of the corresponding portion associated with the selected second state;
providing the third language model prompt as input to the language model to generate a third language model output;
determining whether to execute a function based on the third language model output; and
responsive to determining to execute a second function based on the third language model output, executing the determined second function to generate a second function output, wherein executing the determined second function causes the dialogue system to perform a dialogue action. In some cases, the dialogue action comprises at least one of transferring the user to a human operator or terminating a dialogue with the user.
In some cases, the dialogue action comprises at least one of accessing a database or connecting to an Application Programming Interface (API).

In one example, the method can further comprise storing the first input data and the first language model output as a dialogue history with the user. The second language model prompt can further comprise the dialogue history with the user.

In one example, the method can further comprise querying, based on the first input data, a knowledge base data structure to retrieve information, wherein the first language model prompt further comprises the retrieved information. The knowledge base data structure can comprise a hierarchical tree structure comprising a plurality of nodes, each node of the plurality of nodes representing a topic or a subtopic. In some cases, the querying can further comprise identifying, based on a similarity matching of the dialogue history with the user with each of the plurality of nodes, one or more nodes from the plurality of nodes, and responsive to identifying the one or more nodes, retrieving, from the identified node, the information to be included in the first language model prompt. In some cases, the querying can further comprise determining whether any nodes from the plurality of nodes share a parent node with any of the identified one or more nodes, and retrieving, information from any nodes determined to share a parent node with any of the identified one or more nodes to be included in the first language model prompt.

In one example, the method can further comprise responsive to outputting the speech or text to the user based on the second language model output, receiving, by way of the input, second input data relating to speech or text provided by the user, extracting, via a spoken language understanding module, an intent from the second input data, and selecting a third state based on the extracted intent. The spoken language understanding module can comprise a neural network.

According to one aspect, there is provided a dialogue system, comprising:
a first input configured to receive first input data relating to speech or text provided by a user;
a first output configured to provide speech or text to the user; and
one or more processors, configured to:
select a first state from a plurality of states of a deterministic model, at least some states of the plurality of states being associated with a corresponding portion of a language model prompt including an instruction to call a corresponding function;
responsive to the first state being associated with a corresponding portion, generate a first language model prompt comprising at least part of the corresponding portion associated with the selected first state;
provide the first language model prompt as input to a language model to generate a first language model output;
determine whether to execute a function based on the first language model output;
responsive to determining to execute a first function based on the first language model output, execute the determined first function to generate a first function output;
select a second state from the plurality of states based on the first function output;
responsive to the second state being associated with a corresponding portion of a language model prompt, generate a second language model prompt comprising at least part of the corresponding portion associated with the selected second state;

provide the second language model prompt as input to the language model to generate a second language model output;

determine whether to provide an output to the user based on the second language model output; and provide speech or text to the user based on the second language model output responsive to determining to provide the output to the user.

In one example, the one or more processors is further configured to execute a first module configured to process the first input data, a second module configured to convert input speech data to text data, and a third module configured to generate speech from the second language output.

According to one aspect, there is provided a non-transitory computer readable storage medium comprising computer readable code configured to cause a computer to perform a method comprising the following operations:

selecting a first state from a plurality of states of a deterministic model, at least some states of the plurality of states being associated with a corresponding portion of a language model prompt including an instruction to call a corresponding function;

responsive to the first state being associated with a corresponding portion, generating a first language model prompt comprising at least part of the corresponding portion associated with the selected first state;

providing the first language model prompt as input to a language model to generate a first language model output;

determining whether to execute a function based on the first language model output;

responsive to determining to execute a first function based on the first language model output, executing the determined first function to generate a first function output;

selecting a second state from the plurality of states based on the first function output;

responsive to the second state being associated with a corresponding portion of a language model prompt, generating a second language model prompt comprising at least part of the corresponding portion associated with the selected second state;

providing the second language model prompt as input to the language model to generate a second language model output;

determining whether to provide an output to the user based on the second language model output; and responsive to determining to provide an output to the user based on the second language model output, outputting, by way of an output, speech or text to the user.

BRIEF DESCRIPTION OF THE DRAWINGS

Arrangements of the present invention will be understood and appreciated more fully from the following detailed description, made by way of example only and taken in conjunction with drawings in which:

FIG. 4 shows an illustration of various functionalities of a listen module, which may be used in a dialogue system according to an embodiment;

FIG. 13 illustrates an example language model prompt generated by a prompt generator module which may be used in a dialogue system according to an embodiment;

DETAILED DESCRIPTION

Disclosed herein is a dialogue system and a dialogue method. More specifically, disclosed herein is a dialogue system and a dialogue method that are configured to generate controlled outputs (also referred to herein as "controllable outputs"). The dialogue systems described herein comprise a large language model, such as, for example, a generative pre-trained transformer model.

The systems and methods described herein can be configured to control the large language model that is included in the dialogue system, thereby orchestrating the dialogue (e.g., conversations) with the users of the dialogue system—in other words controlling the conversational flow. Furthermore, in some examples, the systems and methods described herein may eliminate and/or reduce hallucinations and other harmful behaviours of large language models. In some examples, the systems and methods described herein can integrate with third-party applications (e.g., with modules of existing dialogue systems).

As discussed above, "intent-based" dialogue systems may not include generative artificial intelligence models or generative artificial intelligence capabilities. Instead, some of these "intent-based" dialogue systems include models such as for example, a natural language understanding model comprising an intent detection component that can extract one or more intents from user inputs, to detect intent of the user, and a value extraction component that outputs any "slots" and "values" corresponding to the input text. These models can orchestrate the dialogue (e.g., conversation) with the user based on the detected intents, slots and values. An intent detection component may classify input text according to a pre-determined list of possible intents (such as "restart the conversation"). Similarly, such systems may comprise a trained value extraction model corresponding to each of a set of pre-determined slots (such as "date" and "time"). Therefore, such dialogue systems can perform tasks that would fall within the scope of the predetermined set of user intents and slots. Furthermore, the flow of dialogue with the user for these systems may be predetermined. If a user deviates even slightly from the predetermined dialogue paths, such dialogue systems may not be able to generate an appropriate output. Put differently, there may be situations in which such dialogue systems may not be able to help or support the user. In such situations, the dialogue systems may have to request the user to rephrase their inputs or may guide the user to the predetermined paths, thereby making them cumbersome to use. Therefore, such dialogue systems can be extremely fragile to unexpected inputs.

Figure 1:
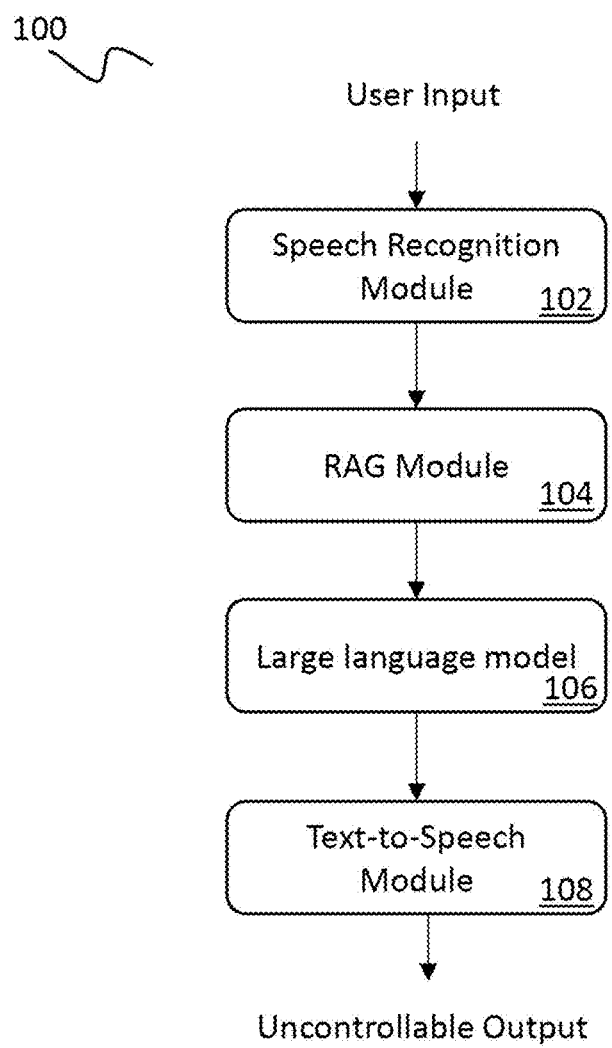
FIG. 1 is a schematic illustration of various functional modules or units of a dialogue program being used in a dialogue system according to a comparative example.

Alternatively, dialogue systems may leverage the capabilities of large language models (e.g., generative pre-trained transformer models) and Retrieval Augmented Generation (RAG). For instance, FIG. 1 is a schematic illustration of various functional modules or units of a dialogue program 100 being used in a dialogue system according to a comparative example. As seen in FIG. 1, the dialogue program 100 comprises a speech recognition module 102, a RAG module 104, a large language model 106, and a text-to-speech module 108. Responsive to the dialogue system receiving a user input in the form of speech (e.g., audio input), the speech recognition module 102 may capture and process the user input (e.g., by performing automatic speech recognition). The processed user input may be obtained by the RAG module 104. The RAG module 104 may assess the user input and identify subjects or topics within the user input. The RAG module 104 may then access a knowledge base to search for the identified subjects or topics within the knowledge base. If the identified subjects or topics are found within the knowledge base, the RAG module 104 extracts information relating to the identified subject or topic. This information may be provided to the large language model 106 together with the user input, thereby providing further context to the user input. The large language model 106 may generate a large language model output based on a language model prompt provided to the large language model 106, comprising the processed user input and the extracted information from the RAG module 104. The text-to-speech module 108 may convert text outputs obtained from the large language model 106 into audio outputs. The audio output may be outputted to the user.

However, dialogue systems using the dialogue program 100 described in relation to FIG. 1 may not behave in line with the task or tasks for which the dialogue system is provided. This is due to the stochastic nature of the large language model 106. The outputs generated by the large language model 106 may depend on a variety of factors such as the language model prompt comprising the user input provided to the large language model 106, the parameters of the underlying generative transformer architecture, and/or the like. Therefore, the outputs from the large language model 106 can be uncontrollable. Furthermore, it may be difficult to safeguard the dialogue systems using the dialogue program 100 against hallucinations without further intervention to filter out harmful and/or controversial outputs.

Described herein are systems and methods for controlling outputs from the large language model 106. In particular, the systems and methods disclosed herein can be integrated with existing LLMs (e.g., such as an LLM used in the dialogue program 100) in a manner such that these systems and methods can orchestrate the interaction between the large language model 106 and the users. In this manner, the systems and methods described herein can orchestrate the dialogue between the dialogue systems and the users.

At a high level, the systems and methods disclosed herein comprise a dialogue management module that can overlay a large language model. The dialogue management module can include a dialogue state module and a dialogue control module. The dialogue control module is also referred to here as a "talk tracks" module. The talk track module can comprise a state machine that can orchestrate the interaction between the users and the large language model. In particular, the state machine can be configured to facilitate the generation of language model prompts to guide the large language model and thus to produce controlled outputs. Furthermore, assembling the prompt for each dialogue turn based on information from the relevant state allows provision of smaller prompts (i.e., fewer input tokens) which improves latency of the system. For example, latency is improved for transformer-based language models, which scale quadratically in relation to input sequence length.

In some examples, the dialogue management module can include a RAG module, a dialogue state module, and a dialogue control module.

In some examples, the RAG module can comprise a knowledge base having a "tree-structure", that can enable retrieval of further information relating to subjects or topics that are identified in the user input. Put differently, the knowledge base can include a "tree-based" data structure that can enable additional information to be retrieved from the knowledge base in a computationally efficient manner. The RAG module can enable generation of additional information to include in the language model prompt to provide additional context to the large language model. The language model prompts including information generated by the RAG module can include information retrieved from the knowledge base. Furthermore, the retrieval can be performed such that the information included in the language model prompts can be referenced back to exact portions of the knowledge base.

The dialogue state module can be further configured to track the dialogue history between the dialogue system and the user and enable generation of additional information to include in the language model prompts to provide further additional context to the large language model. Accordingly, the dialogue state module can provide the large language model with previous outputs generated by the large language model.

In some variations, one or more developers may be given access to the talk track module to dynamically change one or more portions of the talk track module, thereby providing effective control over the interaction between the users and the large language model. In this manner, the dialogue management module can allow a provider of the dialogue system a further measure of control of the flow of conversation with the user.

Furthermore, for example, the dialogue management module described herein can mitigate unexpected behaviour and/or harmful behaviour of the large language model. More specifically, as is readily understood, a large language model is provided with a language model prompt that comprises instructions to guide the large language model to perform one or more tasks. However, as these tasks become complex (e.g., tasks that require step-by-step instructions to be provided to the large language model), the large language model may stop following the instructions exactly (e.g., the large language model may stop following the instructions entirely or may stop following the instructions partially). This can cause the large language model to generate unpredictable and uncontrollable outputs. The dialogue management module described herein that overlays the large language model can facilitate deterministic control of the large language model.

As another example, the dialogue management module described herein can reduce and/or eliminate large language model hallucinations. For instance, the talk tracks module that is included in the dialogue management module can be configured to govern the flow of dialogue between the dialogue system and the user. In particular, the deterministic state machine of the talk tracks module can include clear transitions that guide the large language model to follow a specific dialogue path. Furthermore, the dialogue state module can maintain the information collected so far deterministically and feed this information back into the large language model, by including the dialogue history between the dialogue system and the user in the language model prompts. This can implicitly ground the large language model at each dialogue turn. The RAG module can generate additional information to include in the language model prompts that include reference-able information from the knowledge base. Therefore, information that causes the large language model to generate unpredictable output can be easily looked-up and amended. Additionally, the talk tracks module, the RAG module, and the dialogue state module are configured to interact with each other to exchange information. This can further enhance the control of the large language model.

As yet another example, the dialogue management module can be designed such that the module can easily overlay on a large language model in an existing dialogue system. That is, the dialogue management module can also be designed to be compatible with other types of third-party software (e.g., large language model) without requiring additional customisation or human intervention. Therefore, the dialogue management module can be easily integrated into an existing dialogue system. Furthermore, the design of the dialogue management module can enable previous design paradigms to either be fully replaceable or to enable creation of hybrid solutions.

As yet another example, the dialogue management module can configured to automatically generate language model prompts that can be provided to the large language model. This can mitigate the need for programmers/developers to create a huge amount of text to be provided as language model prompt to the large language model. More specifically, the dialogue management module can automate the generation of language model prompts, thereby reducing the need for human intervention or human supervision. The modularity and deterministic nature of the dialogue management module can make it easy for programmers/developers to spot bugs or errors in the dialogue program that may need fixing. Furthermore, the programmers/developers may be provided access to portions of the dialogue management module so as to dynamically fix errors and/or to improve the deterministic outputs of the dialogue system if need be. Such access can also allow the programmers/developers to change the design of the dialogue system or the dialogue method when needed, thereby making the dialogue system and the dialogue method more robust.

Example System

Figure 2:
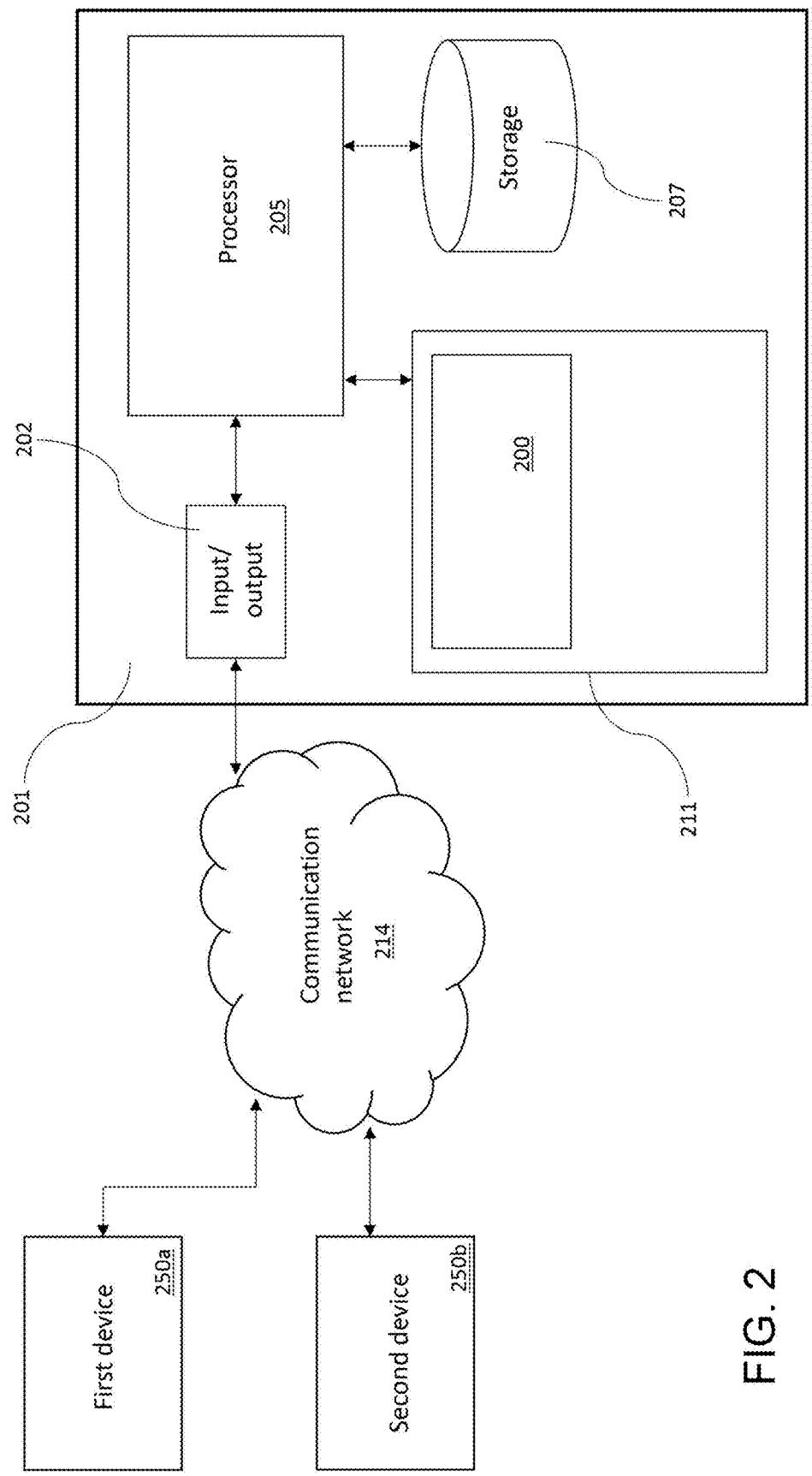
FIG. 2 is a schematic illustration of a system comprising a dialogue system, a first device, and a second device, according to an embodiment.

FIG. 2 is a schematic illustration of a system comprising a dialogue system 201, a first device 250a, and a second device 250b, according to an example. The dialogue system 201 can be configured to communicate with the first device 250a and the second device 250b via a communication network 214 (e.g., Internet). In this example, the first device 250a and the second device 250b communicate with the dialogue system 201 through the same communication network 214. But, in other examples, the first device 250a and the second device 250b may communicate with the dialogue system 201 via different communication networks. For example, the first device 250a may communicate with the dialogue system 201 via a telephone network.

The first device 250a can be configured to provide output to a first user and receive input from a first user. In this example, the first user provides spoken inputs (e.g., audio inputs) to the first device 250a and the first device 250a provides audio outputs to the first user. The first device can be any suitable computing device such as for example, computers (e.g., desktops, personal computers, laptops, etc.), tablets and e-readers (e.g., Apple iPad®, Samsung Galaxy® Tab, Microsoft Surface®, Amazon Kindle®, etc.), mobile devices and smart phones (e.g., Apple iPhone®, Samsung Galaxy®, Google Pixel®, etc.). In some examples, the first device can be a telephone that is configured to receive and output audio. The first device 250a can comprise a microphone for receiving audio inputs from the first user and a speaker for outputting audio outputs to the first user.

Where the first device 250a is a computing device, the first user may interact with the dialogue system 201 through a web-based portal or through an application running on the first device 250a. For example, the first user may access a web-based portal in a web browser running on the first device 250a or through an application running on the first device 250a. The first user can provide spoken inputs through the web browser or the application. The audio signal can then be processed and the data can be sent from the first device 250a to the dialogue system 201 over the communication network, using Voice over Internet Protocol (VoIP). Data received from the dialogue system 201 at the first device 250a over the communication network 214 can then be processed and provided as an audio output to the first user through the web-browser or the application.

Although here an example is described in which the dialogue system 201 interacts with the first user through audio, it should be noted that the dialogue system 201 can be configured to interact with the first user with one or both of text and audio signals. Working with text (and not only audio) can allow, for example, hearing impaired and mute people to also use the dialogue system 201. The first device 250a may therefore additionally or alternatively comprise a keyboard for receiving text inputs from the first user and a screen for displaying text outputs to the first user, or a touchscreen for receiving text inputs and displaying text outputs for example.

The second device 250b can be configured to provide output to a second user and to receive input from a second user. The second device 250b can be any suitable computing device such as for example, computers (e.g., desktops, personal computers, laptops, etc.), tablets and e-readers (e.g., Apple iPad®, Samsung Galaxy® Tab, Microsoft Surface®, Amazon Kindle®, etc.), mobile devices and smart phones (e.g., Apple iPhone®, Samsung Galaxy®, Google Pixel®, etc.). The second device 250b can comprise hardware components such as a keyboard, screen and mouse, or a touchscreen, for receiving inputs and displaying outputs to the second user. The second device 250b can provide inputs through a command line interface and/or a graphical user interface (GUI). For instance, the GUI may be provided through a web-based portal, through an application or as a program that runs on the second device 252b for example, and is displayed on the second device 252b. The input data from the second device 250b can be processed and sent from the second device 250b to the dialogue system 201 via the communication network 214.

The dialogue system 201 in this example can be a server. The dialogue system 201 can comprise an input/output component 202, a processor 205, a working memory 211, and a storage 207. In some examples, the server may be configured to run on a cloud platform (e.g., Microsoft Azure@, Amazon® web services, IBM@cloud computing, etc.).

The processor 205 can be coupled to the storage 207 and can access the working memory 211. The processor 205 may comprise logic circuitry that responds to and processes the instructions in code stored in the working memory 211. In particular, when executed, a dialogue program 200 can be represented as a software product stored in the working memory 211. The dialogue program 200 will be described in more detail in relation to FIG. 3. Execution of the dialogue program 200 by the processor 205 can cause examples as described herein to be implemented.

The processor 205 can also access the input/output component 202. The input/output component 202 may be a single component or may be divided into a separate input component and output component. Furthermore, multiple input or output components may be provided for receiving and sending different inputs and outputs. The input/output component 202 can be configured to receive data transmitted through the communication network and output data to be transmitted through the communication network.

In particular, input data from the first device 250a may correspond to audio (and/or to text input). This data can be received through the input/output component 202 and processed by the dialogue program 200 through a first interface 352a, which will be described below. A first user of the first device 250a may interact with the dialogue program 200 by providing an audio input in order to access a chat-based search, recommendation, or booking service provided by the dialogue system 201 for example. Output audio data generated by the dialogue system 201 can be provided through the first interface 352 to the input/output component 202 and transmitted to the first device 250a through the communication network 214.

Input data from the second device 250b can also be received through the input/output component 202 but may be processed by the dialogue program 200 through a second interface 352b, which will be described below. A second user of the second device 250b can interact with the dialogue program 200 by providing inputs through the command line interface corresponding to commands to modify at least a portion of the dialogue program 200. The dialogue system 201 may communicate with further devices and systems over the communication network. Although in this example, interaction with a second device 250b allowing a second user (for example a developer) to modify the dialogue program is shown, in other example systems the dialogue system 201 does not include the second interface 352b, and interacts only with users of the system such as the first user.

The processor 205 can also be configured to communicate with the non-volatile storage 207. The storage 207 may contain data that is used by the dialogue program 200 when executed by the processor 205. As illustrated, the storage 207 can be local memory that is contained in a device. Alternatively however, the storage 207 may be wholly or partly located remotely, for example, using cloud based memory that can be accessed remotely via the communication network 214. The dialogue program 200 may be stored in the storage 207. The dialogue program 200 may be placed in working memory when executed.

As illustrated, the system 201 comprises a single processor. However, the dialogue program 200 may be executed across multiple processing components, which may be located remotely, for example, using cloud based processing. For example, the dialogue system 201 may comprise at least one graphics processing unit (GPU) and/or tensor processing unit (TPU) and a general central processing unit (CPU), wherein various operations described in relation to the methods below are implemented by the GPU or TPU, and other operations are implemented by the CPU. For example, matrix operations or vector operations may performed by a GPU or TPU. For example, tasks performed by large language model 306 as described herein may be performed by a GPU or TPU. Operations performed by the dialogue management module 360 as described herein may be performed by CPU.

Usual procedures for the loading of software into memory and the storage of data in the storage unit 207 apply. The dialogue program 200 can be embedded in original equipment, or can be provided, as a whole or in part, after manufacture. For instance, the dialogue program 200 can be introduced, as a whole, as a computer program product, which may be in the form of a download, or can be introduced via a computer program storage medium, such as an optical disk. For example, the computer program may be downloaded on the first device 250a from a digital distribution platform such as app store or application store (e.g., Chrome® web store, Apple® web store, etc.). Additionally or alternatively, the first device 250a may render a web browser (e.g., Mozilla®, Google®, Safari®, Internet Explorer®, etc.). The web browser may include browser extensions, browser plug-ins, etc. that may render the computer program on the first device 250a. Modifications to existing software can be made by an update, or plug-in, to provide features of the above described example.

While it will be appreciated that the below examples are applicable to any computing system, the example computing system 201 illustrated in FIG. 2 provides means capable of putting an example, as described herein, into effect.

Figure 3:
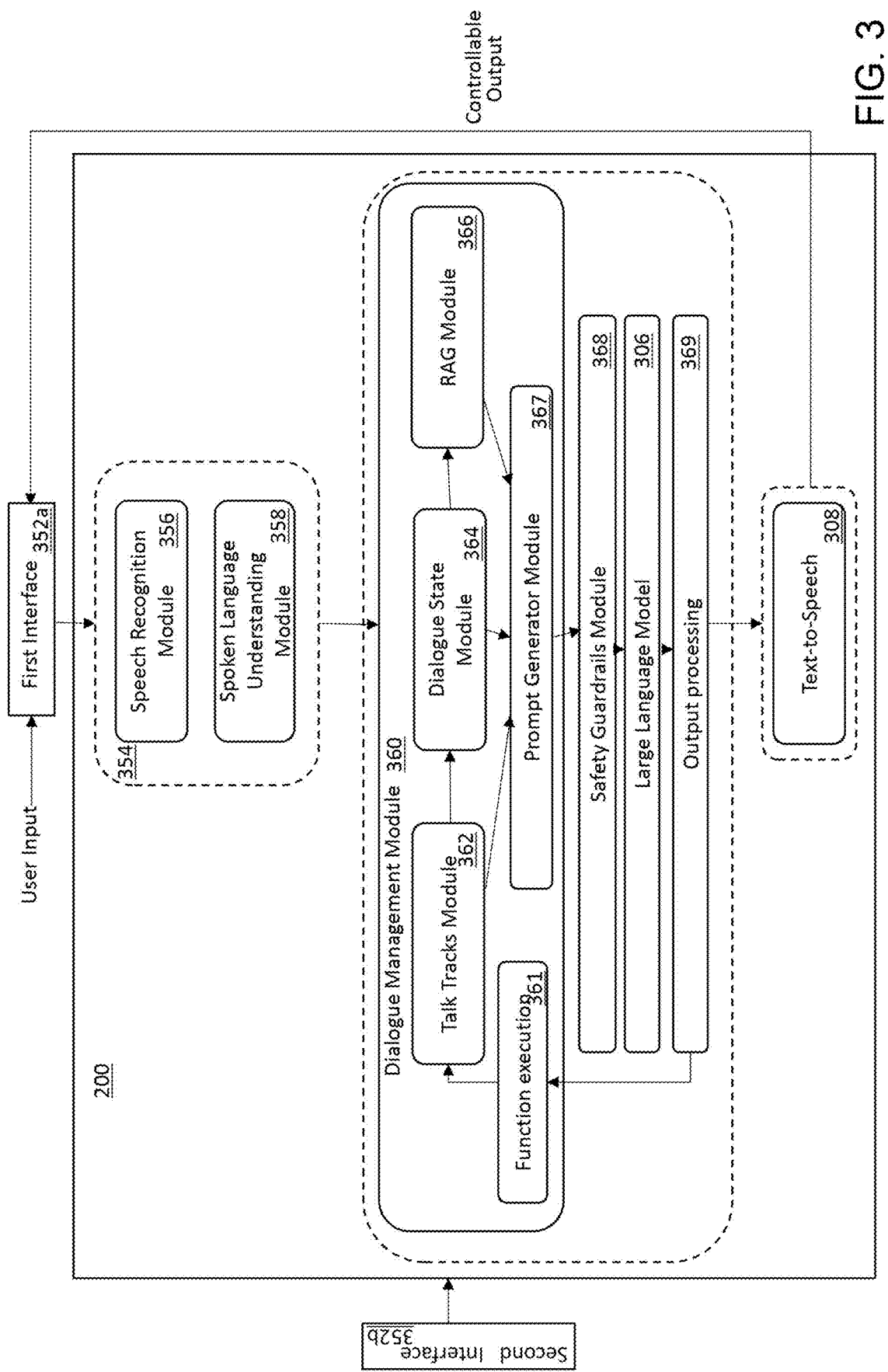
FIG. 3 shows a schematic illustration of various functional modules or units of a dialogue program which may be used in a dialogue system according to an embodiment.

FIG. 3 shows a schematic illustration of various functional modules or units of a dialogue program 200 which may be used in a dialogue system 201 according to an embodiment. The modules may be implemented as one or more computer programs. An example computer program can comprise a set of instructions that can be executed by a processor such as for example, processor 205. For example, all of the modules may be components of a single computer program. As another example, each of the modules may be implemented as individual computer programs communicating so as to provide the described functionality. As another example, a subset of the modules may be implemented as one computer program and the other modules may be implemented as one or more other computer programs. In some examples, the processor 205 may comprise instructions and/or software code to execute the modules described in FIG. 3. The instructions and/or software code may include separate calls to separate modules. In some examples, a call to one module may redirect the processing performed by the processor 205 to implement that module. In some examples, the processor 205 may be configured to execute each module in a series one after the other. Alternatively, the processor 205 may execute two or more modules simultaneously. The modules and their functions are described in detail below.

The dialogue program 200 that is used by the dialogue system 201 can comprise a listen module 354, a dialogue management module 360, a safety module 368, a large language model 306, and a text-to-speech module 308. In this example, the dialogue program 200 can receive, by way of first interface 352a, an input signal relating to speech provided by a first user. As discussed above, in other examples, the input signal may relate to text, or a combination of text and speech, provided by the first user. The dialogue program 200 can process the input signal, determine a dialogue output based on the processing, and output the dialogue output to the first user, in a manner described below. The dialogue output can be outputted by way of the first interface 352a. In some examples, the dialogue output may be speech information (and/or text information) based on a controlled output from the large language model 306. In other examples, the dialogue output may be a dialogue action. In this example, the first interface 352a can include a frontline service that receives Voice over Internet Protocol (VoIP) traffic and converts received data into media streams. In particular, the first interface 352a can receive encoded digital signals and convert them to an audio file. The first interface 352a can be further configured to redirect media streams, voice commands, transcriptions, and instructions to other modules. For instance, the audio file corresponding to the received input signal can be redirected to other modules.

Listen Module

Audio file corresponding to the received input signal can be received at the listen module 354. In this example, the listen module 354 can comprise a speech recognition module 356 and a spoken language understanding module 358. The speech recognition module 356 can transcribe the audio file (e.g., corresponding to the received input signal) into text. The speech recognition module 356 can comprise one or more automatic speech recognition (ASR) models to perform automatic speech recognition. The ASR models can be configured to generate a text signal from the audio file. In this example, the ASR models can be structurally and/or functionally similar or identical to the ASR models described in U.S. patent Ser. No. 11/430,446, which is hereby incorporated by reference in its entirety. Additionally or alternatively, the ASR models can be any suitable pre-trained general purpose ASR model, such as for example, Nvidia® RIVA, Google® ASR model, Amazon® ASR model, Deepgram® ASR model, a combination thereof, and/or the like.

Generally, the ASR models included in the speech recognition module 356 can be trained to output an N-best list of text transcriptions corresponding to the audio file (e.g., corresponding to the received input signal), where N is a positive integer greater than or equal to 1. For instance, the ASR models can be trained to assign posterior probabilities to words in a given input signal. The full posterior distributions over the ASR hypotheses may be approximated by returning the top N most probable text hypotheses, optionally with their respective probabilities. The ASR models can output a list of N text sequences, which are the N most probable text sequences corresponding to the input signal. Thus, the ASR models can output an N-best list of text transcriptions corresponding to the input signal. In this example, the ASR models can be trained to perform one or more of the following: (a) contextual biasing; (b) numeric or alphanumeric recognition; (c) accent recognition; (d) language recognition; (e) probability boosting of certain words and/or word patterns; (f) corrections to the list of N text sequences; (g) phenome matching; (h) result aggregation; and/or (i) a combination thereof.

In some examples, the one or more ASR models are used together with a voice activity detection (VAD) module. The one or more ASR models only process portions of the input signal that are identified as voice by the VAD module. This provides improved latency, by removing unnecessary parts from the input audio signal prior to processing by the one or more ASR models.

The spoken language understanding (SLU) module 358 is an optional module. The spoken language understanding module 358 comprises a collection of algorithms and machine learning models that can recover information from incorrect speech transcriptions coming from the speech recognition module 356, using context and user information to infer the correct text corresponding to the user input. Accents, background noise, recognition errors, domain specificities, and particular named entities may make voice difficult to transcribe. The SLU module 358 comprises a collection of algorithms that operate on the output of the speech recognition module 356, or together with the speech recognition module 356 in order to improve the captured semantics from the user input. In some examples, the processing performed by the SLU module 358 may be dependent on the state currently selected by the talk tracks module 362. For example, based on the current state, a particular regular expression may be applied by the SLU module 358.

The SLU module 358 can recover names (such as Hernandez). The SLU module 358 can bias phonetically similar words contextually (in the context of restaurant bookings, the word 'eight' is much more likely than a phonetically similar word 'hate'). The SLU module 358 may use techniques to support different ways people speak when they need to convey certain alphanumeric codes (e.g., to support NATO alphabet, the user can say 'double eight') and those alphanumeric codes can be normalised to the final format that is processed further (e.g., as part of an ID&V module or as part of checking the membership against some database of member records).

For example, the spoken language understanding module 358 may comprise an alphanumeric parsing sub module. An example alpha-numeric parsing submodule is described in U.S. patent Ser. No. 11/537,661, incorporated herein by reference in its entirety. Such a submodule performs alpha-numeric parsing and normalisation. For example, a set of one or more pre-defined regular expressions may be used to select a character sequence from a list of candidate text sequences (e.g. the N-best list) output from the speech recognition module 356. In some examples, the one or more regular expressions used may be controlled by the dialogue management module 360, such that different regular expressions are applied depending on which state the talk tracks module 362 has selected. For example, when a 4 letter code is being sought, a suitable regex would be "[A-Za-z][A-Za-z][A-Za-z][A-Za-z]". Here, "[A-Za-z]" means any uppercase characters from "A" to "Z" or any lower case characters from "a" to "z". Another example is for obtaining a UK postcode where the $3^{rd}$ and $5^{th}$ characters are normally a number. In this case, the regex may be: "[A-Za-z][A-Za-z][0-9][A-Za-z0-9][0-9][A-Za-z][A-Za-z]". Using the regular expression to extract only valid alphanumeric inputs means that the extraction is robust to noisy speech recognition.

Additionally or alternatively, a transcript post-processing step may be performed to processes each candidate returned by the speech recognition module 356. The transcript post-processing step comprises applying a set of one or more rules to the output of the speech recognition module 356, i.e. the N-best list. The one or more rules may include: normalising into a common format by substituting one or more specific words with corresponding characters; correcting common ASR errors back to letters or words; substituting expressions denoting double characters or triple characters by their individual characters; filtering filler words that commonly occur in ASR; processing letter-for-word spelling; and processing NATO spelling. For example, as shown in FIG. 4, the alphanumeric parsing sub module may receive an output of the speech recognition module 356 "Apple Charlie Echo double eight 0 for 7" and replace it with the text "ACE88047".

In this manner, if the transcribed text (e.g., output from the speech recognition module 356) is incorrect, the spoken language understanding module 358 described herein can recover information from the incorrectly transcribed text.

Typically, accents, background noise, domain specificities, etc. can make it difficult to extract information from audio files. The listen module 354 (e.g., the speech recognition module 356 and the spoken language understanding module 358) can be configured to transcribe the audio file to text in a robust manner. FIG. 4 shows an illustration of various non-limiting functionalities of the listen module 354, according to an example. As seen in FIG. 4, the listen module 354 can perform contextual recognition, alphanumeric parsing, and identification of N-best list of text transcriptions.

For instance, the listen module 354 can recognize and correct names such as for example, correcting "an Indus" to "Hernàndez". For example, the ASR models described herein may be trained to recognize names and correct user input from the first user for names. The listen module 354 may also be configured to bias phonetically similar words contextually. In this example, a first user interacts with the dialogue system to reserve a table at a restaurant. The listen module 354 (e.g., the ASR models described herein) can perform contextual biasing on the first user input "Actually, can you make that hate people?" to detect that the word "hate" is phonetically similar to "eight", and that the word "eight" is more likely to be appropriate given the context. The listen module 354 can also support alphaneumeric codes in the user input. In this example, the user input includes a NATO alphabet "double eight". The ASR models described herein may perform alphaneumeric recognition to normalise the alphaneumeric codes to a final format, such as for example, "double eight" to "88". The listen module 354 may be configured to improve the performance of the ASR models described herein. For instance, the listen module 354 may perform model ensembling to select the output "Unfortunately, I have lost my card" from multiple possible outputs as shown in FIG. 4. Although in this example, the input signal corresponds to an audio file it should be understood that where the user input is provided as text, the listen module 354 may not be included in the system.

Figure 5:
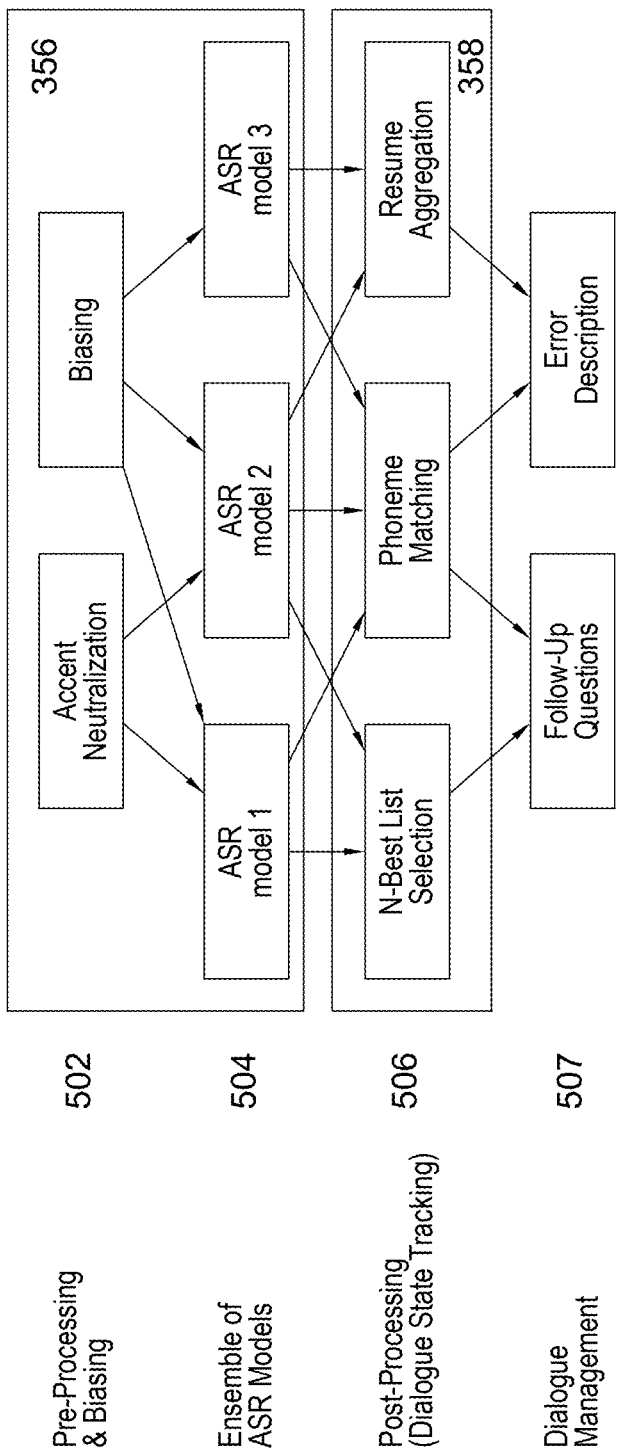
FIG. 5 is an example flowchart depicting an example method for transcribing an audio file that is based on input signal using the listen module, and feeding the transcribed text from the listen module to the dialogue management module.

FIG. 5 is an example flowchart depicting an example method for transcribing an audio file that is based on input signal using the listen module 354 and feeding the transcribed text from the listen module 354 to the dialogue management module 360. At step 502, the listen module 354 can perform pre-processing and biasing of the audio file that corresponds with the input signal. For instance, in this example, the listen module 354 performs accent neutralization of the audio in the audio file, and biasing of the audio in the audio file. More specifically, the listen module 354 described herein may be fine-tuned to a wide spectrum of accents. By enabling the listen module 354 to support a variety of accents allows the listen module 354 to neutralise diversity in accents. At step 504, the listen module 354 can apply ASR models to process the audio file and transcribe the audio file to text. At step 506, the listen module 354 can perform post processing, such as for example, identifying N-best list of text transcriptions, performing phenome matching, and performing results aggregation. This step is performed by the SLU module 358.

An ASR model may assign posterior probabilities to words in an utterance given the input signal. The N-best list selection module output then takes the form of an N-best list, which approximates the full posterior distributions over the ASR hypotheses by returning the top N most probable text hypotheses, optionally with their respective probabilities. The audio user input is provided to the selected ASR model(s), and the output from the selected ASR model(s) is provided to the N-best list selection module, which outputs a list of N text sequences, which are the N most probable text sequences corresponding to the audio input.

A first ASR model in the set of models may be configured to recognise an alphanumeric character sequence with improved accuracy. For example, the first ASR model may be trained using a training dataset comprising a larger proportion of alphanumeric sequences. A second ASR model may be configured to recognise a numeric sequence with improved accuracy. For example, the second ASR model may be trained using a training dataset comprising a larger proportion of numeric sequences. A third ASR model may be configured to recognise words spoken with an American accent with improved accuracy. For example, the third ASR model may be trained using a training dataset comprising a larger proportion of words spoken in an American accent. A fourth ASR model may be configured to recognise words spoken with an English accent with improved accuracy. For example, the fourth ASR model may be trained using a training dataset comprising a larger proportion of words spoken in an English accent. A plurality of language specific ASR models, corresponding to different languages, may also be included in the set of models. A different ASR model may be set by the model selection 34 for a dialogue turn. For example, if a particular input type (e.g. an alphanumeric or numeric-only sequence) is expected for a particular dialogue turn, the ASR model with the highest accuracy on such input types may be set in the turn level configuration settings.

In this example, the ASR module 356 further comprises a bias setting module. The bias module is configured to boost the probabilities that certain words and/or word patterns are recognised in a particular input speech utterance. An ASR model may comprise an acoustic model. The bias module may use word boosting methods, which give each of a set of one or more "words of interest" a higher score when generating text from the output of the acoustic model. The bias module stores a set of one or more "words of interest", together with a weight corresponding to each word of interest. The weights are used to increase the likelihood that sequences of phones which form these "words of interest" are selected. In order to implement word boosting, a set of words of interest and a corresponding weight for each word is provided to the biasing module. The set of words and the weights included in the biasing module are configurable settings of the ASR module 356. The bias module may also be used to boost the probabilities that certain patterns are recognised. In this case, the bias module stores a set of patterns of interest and corresponding weights.

Contextual biasing may be implemented, in which the set of words and/or patterns of interest, and weights, are configured per dialogue turn. For example, the ASR module 356 may be configured to increase the likelihood that dates are recognised, for dialogue turns when it is expected that the user response will include a date. Contextual biasing allows different words to be boosted depending on the current context. For example, if it is expected to receive an answer to a Yes/No question for the dialogue turn, the list of words of interest will comprise words related to "Yes" or "No" (e.g., "Yeah", "yep", "correct", "nope", "no" . . . ). If a numerical answer is expected, the list of words of interest will comprise numbers (e.g., "three" (people) over "free" (people) as an example). As another example, the ASR module 356 may be biased so as to increase the likelihood that the details of a particular restaurant are recognised, e.g. if the restaurant name is "Willow Tree Cafe" then the probability that "Willow", "Tree", and "Café" are recognised may be increased. Thus words of interest may also comprise uncommon and infrequently named entities (e.g., names of particular hotels and restaurants that are stored in the knowledge base).

The ASR module 356 in this example further comprises a phoneme matching module. The phoneme matching module takes as input phonetic units and performs matching at the phonetic level. In this example, one or more of the set of ASR models is configured to additionally output phonetic text. For example, the phonetic text may represent the pronunciation of the one or more audio inputs using a phonetic alphabet, e.g. the International Phonetic Alphabet (IPA) or Speech Assessment Methods Phonetic Alphabet (SAMPA). Characters of phonetic text may be referred to as phonemes. For example, one or more ASR models may perform a first step of generating a phonetic text from the audio signal, and a second step of generating an orthographic text from the phonetic text. Both the phonetic text and the orthographic text are outputted. The N-best list selection may select a list of N possible orthographic texts and the N corresponding phonetic texts. The phonetic texts may then be compared to one or more stored dictionaries in the phoneme matching module. These dictionaries comprise mappings between phonetic text and orthographic text for a set of words. For example, the Serbian name "Mrksic" is often translated into "Milkshake" by an English ASR model. By outputting a phonetic text corresponding to the name "Mrksic", searching the stored dictionaries for this phonetic text, and retrieving a orthographic text corresponding to the phonetic text in the dictionary, such words may be more accurately transcribed.

The ASR module 356 in this example further comprises a result aggregation module. The results aggregation module may allow the ASR module to operate in an "over-generation" and "ranking" approach, in which multiple models or modules are used on the same input to produce different predictions. These are then assembled by the results aggregation module afterwards to improve the accuracy. For example, they may be ranked in an order of likelihood of correspondence to the input audio.

In some examples, the spoken language understanding module 358 can contribute to the orchestration of interaction between the first users and the large language model via the talk tracks module 362. In particular, the talk tracks module 362 comprises a deterministic model as further described below. The deterministic model comprises a plurality of states that are configured to orchestrate a flow of dialogue with the first user. A selection of a state in the plurality of states may be based on values and/or intents extracted by the spoken language understanding module 358. For example, if the spoken language understanding module 358 extracts an intent from the user input that the first user wishes to speak to a human operator, then this extracted intent may cause a transition to a state in the deterministic model of the talk tracks module 362 that includes a function to transfer the first user to a human operator. Accordingly, in some examples, the spoken language understanding module 358 may cause a state in the deterministic model to be selected.

For example, the spoken language understanding module 358 can comprise one or more sub-modules, such as for example a natural language understanding (NLU) module such as described in U.S. patent Ser. No. 11/430,446, incorporated herein by reference in its entirety. As an example, the spoken language understanding module 358 receives text from the speech recognition module 356 and can extract intent and/or values from the received text, via the NLU sub-module. More specifically, the ASR models described herein can be trained to perform contextualised and biased automatic speech recognition of the audio file (corresponding to the input signal) as discussed above. The spoken language understanding module 358 can be configured to perform contextual recognition to extract values and/or intent (e.g., via the NLU sub-module) from the transcribed text outputted by the ASR models. In examples in which the input signal comprises text instead of audio, the spoken language understanding module 358 can be configured to perform contextual recognition on the text that relates to the input signal so as to extract values and/or intent from the text.

For instance, the NLU sub-module can receive the N-best list of text transcriptions from the ASR module and can extract any slots and values corresponding to the input text. Each dialogue slot corresponds to a subject that a speech signal may relate to, such as the party size for a restaurant booking for example. The dialogue slot may take on one or more "values". The term "value" is used here to refer to any information that fills the slot, and is not limited to numbers—for example the value may be the restaurant name. For example, where the text signal corresponding to the user input is "I would like a table for 4 people please", a value extraction sub-module within the NLU module extracts a "party size" slot with the value "4". The standard value extraction module 83a may use rule-based methods such as template matching or grammar-based methods for example to extract the slot values. Alternatively, data-driven methods can be used, in which statistical models learn from annotated data. Techniques including Inductive Logic Programming, Generative Probabilistic Models, Weighted Finite State Transducers, Support Vector Machines and many others may be used for example. In some examples, a large language model may be uses as a value extractor, for example having a dedicated prompt oriented towards extraction of particular values (such as UK postcodes) or an instruction-tuned large language model may be used to do value extraction. A general-purpose or specialised LLM may be used to perform value extraction, without predefined labels (i.e., without predefined values). The value extraction module may be treated as a sequence labelling problem, where each word in an utterance is labelled. Labelling models such as Conditional Random Fields or Recurrent Neural Networks can be used. An example value extraction method which may be used is described in U.S. Ser. No. 11/132,988B1, "Dialogue system, a dialogue method, and a method of training", the entire contents of which are incorporated by reference herein. In this example, the value extractor model comprises multiple trained models, where each model corresponds to a different slot. The output of each model comprises a sequence of tags corresponding to each token in the input text signal. The parts of the input text signal corresponding to the tokens tagged as corresponding to the slot value are extracted. For slots where the output contains no such tokens, no value is extracted for the slot for the turn. The extracted part of the input phrase for each slot is then normalized to a slot value. This can be performed using a rule-based system. Once a slot value is extracted, this is paired with the slot corresponding to the model, resulting in a slot value pair.

The NLU sub-module can also perform intent classification. For example, the NLU sub-module may classify the text signal (e.g., generated from the audio file), or a part thereof, as corresponding to one of a set of possible user intents. Each of the intents may provide an indication of an operation to perform. An example intent might be that the user wishes to speak to a human operator for example. A general-purpose or specialised LLM may be used to perform intent detection, without predefined labels and classes (i.e., without predefined intents). An intent detection module may comprises an encoder and a classifier. The encoder is a pre-trained sentence encoder. A sentence encoder such as BERT may be used for example. A sentence encoder as described in "ConveRT: Efficient and Accurate Conversational Representations from Transformers, Henderson et al, arXiv:1911.03688v2, 29 Apr. 2020, the entire contents of which is incorporated by reference herein may be used for example. A sentence encoder as described in U.S. Ser. No. 11/210,306B2, "Dialogue system, a method of obtaining a response from a dialogue system, and a method of training a dialogue system", the entire contents of which is incorporated by reference herein, may be used for example. The encoder outputs a vector representation for the input text. This is taken as input to the classifier model. The classifier model may be a multi-layer perceptron model. The classifier model outputs a probability that the input vector representation corresponds to each of a set of two or more intents. In other words, the classifier is a multi-class classifier. For example, the Multi-Layer Perceptron (MLP) comprises one hidden layer with ReLU non-linear activations, followed by an output layer with a softmax activation function for multi-class classification. The dimension of the output layer corresponds to the number of classes—i.e. the number of possible intents. The value of each element in the output vector corresponds to the probability that the input text corresponds to the particular intent. The MLP model is trained separately to the encoder. A general MLP model may be trained using an intent detection dataset. Example such datasets include Web Apps, Ask Ubuntu, or the Chatbot Corpus (described in "Evaluating natural language understanding services for conversational question answering systems", Braun et al, 2017, In Proceedings of SIGDIAL, pages 174-185). The MLP model is trained using the pre-trained encoder to process the input text. The MLP model comprises a number of trainable parameters, including the layer weights and biases. The parameters are initialised as random values. The MLP model is trained using stochastic gradient descent (SGD). A process of updating the parameter values by computing the gradient of a loss function and updating the parameter values using the computed gradient and an optimiser function is performed. A cross entropy loss may be used. During training, the gradient of the loss with respect to each of the trainable parameters of the MLP is determined through back-propagation. The gradient is then used to determine the updated parameters, using the optimiser function.

Although examples of value extraction and intent classification are described, in general, value extraction and intent classification performed by the NLU sub-module may be implemented using one or more finite state transducers (FSTs), a date parsing library, and/or one or more machine-learning models, e.g. one or more neural networks for example.

Additionally or alternatively, in some examples, a state of the deterministic model may cause the application of one or more sub-modules of the spoken language understanding module 358. For example, the processing performed by the SLU module 358 may be dependent on the state currently selected by the talk tracks module 362. For example, based on the current state, a specific value extractor, i.e. corresponding to a particular slot, may be applied at the SLU module 358. For example, specific value extractors may be linked to particular 'states' of the talk tracks module 362.

At step 507, the output from the listen module 354 can be received at the dialogue management module 360. If the output from the listen module 354 includes an error or is inconsistent, the dialogue management module 360 can be configured to perform error recovery. For example, if the output from the listen module 354 is semantically incoherent and the dialogue management module 360 is unable to proceed, then dialogue management module 360 can transmit follow-up questions that can be sent to the first user. In some scenarios, the dialogue management module 360 can provide a description of error (e.g., error in transcribing to text, error in identifying N-best list, etc.) for further processing by the dialogue management module 360.

While in some examples, the spoken language module 358 described herein may be included in the dialogue program 200, in other examples, any suitable spoken language module 358 may be included in the dialogue program 200. Put differently, in these other examples, any suitable model that is trained to extract intent and/or values may be included in the dialogue program 200. Such extracted intent and/or value can contribute to the orchestration of the dialogue flow as described herein. In yet other examples, the dialogue program 200 may not include a spoken language module 358 at all. Instead, in these examples, the large language model 306 may recognize intent based on inputs from the user. Such intents recognized by the large language model 306 may contribute to the orchestration of the dialogue flow. Furthermore, in some examples, the dialogue system may output a query to the first user such that the number of possible responses to the query is limited. As a non-limiting illustrative example, the query may be a question to which the possible answers may be a binary—"Yes", or "No". In such cases, the dialogue program may include conditional rules to orchestrate the dialogue flow. For instance, in such cases, the conditional rules may cause a specific state of the deterministic model described herein to be selected based on the input from the first user. In the above example, if the input from the first user is "Yes", a first state of the deterministic model may be selected. However, if the input from the first user is "No", a second state that is different from the first state may be selected.

Dialogue Management Module

Figure 6:
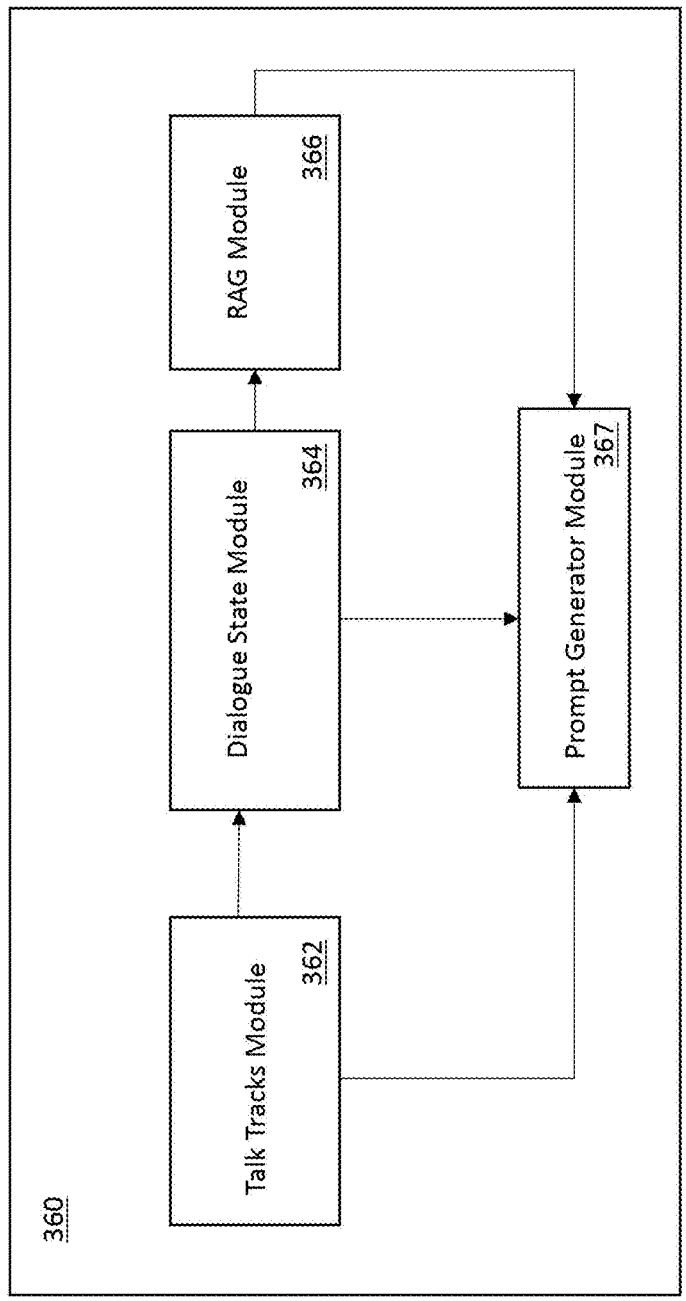
FIG. 6 is a schematic illustration of various modules of a dialogue management module which may be used in a dialogue system according to an embodiment.

The dialogue management module 360 can comprise a talk tracks module 362, a dialogue state module 364, a RAG module 366, and a prompt generator module 367. FIG. 6 is a schematic illustration of various modules of the dialogue management module 360 and the interaction between these modules in a dialogue system according to an embodiment.

The talk tracks module 362 can enable generation of a controlled dialogue output from the dialogue program 200. The talk tracks module 362 comprises a deterministic model, such as for example a state machine. The deterministic model can comprise a plurality of states that are configured to orchestrate a flow of dialogue with the first user. For instance, at least some of these plurality of states (e.g., a subset of states) can store at least two types of information: (a) a portion of a language model prompt that is associated with that state; and (b) information associated with a function that defines a transition from that state. When a first state from this subset of states is selected, the prompt generator module 367 can be configured to generate a language model prompt for the large language model 306 based (at least in part) on the portion of language model prompt that is associated with the first state. This language model prompt generated by the prompt generator module 367 can be provided to the large language model 306 to generate a large language model output. The flow of dialogue may continue to be associated with the first state of the deterministic model until the function that defines the transition from the first state is executed. The function that defines the transition from the first state, when executed, can cause a second state of the plurality of states to be selected. If the second state belongs to the subset of states discussed above, then the prompt generator module 367 can be configured to generate another language model prompt for the large language model 306 based (at least in part) on the portion of the language model prompt that is associated with the second state. This language model prompt generated by the prompt generator module 367 can be provided to the large language model 306 to generate another large language model output. The flow of dialogue may continue to be associated with the second state until the function that defines the transition from the second state is executed. At least some dialogue outputs that are outputted via the first interface 352a may be based on these large language model outputs. Accordingly, the talk tracks module 362 can enable generation of controllable dialogue outputs (e.g., including large language model outputs) from the large language model, thereby controlling the dialogue flow with the first user. Although the dialogue output discussed in this example is a large language model output, it should be understood that the talk tracks module 362 can enable generation of dialogue outputs that may not be a large language model output as further described below.

Inputs from the first user (e.g., text corresponding to speech input by the first user and/or text that is input by the first user) and text corresponding to dialogue outputs generated responsive to the inputs from the first user (e.g., including dialogue outputs facilitated by the talk tracks module 362) can be stored as dialogue history by the dialogue state module 364. The prompt generator module 367 can be configured to generate language model prompts based (at least in part) on the dialogue history stored at the dialogue state module 364. These language model prompts generated by the prompt generator module 367 can be provided to the large language model 306 to generate large language model outputs. The dialogue history can provide additional context to the large language model 306 to guide the large language model 306 to generate large language model outputs. For example, the dialogue history may comprise information relating to the first user that the first user may have previously provided to the dialogue program 200. A large language model prompt that is generated based on this dialogue history may provide context relating to the first user to the large language model 106. In particular, this large language model prompt may guide the large language model 106 to use the information relating to the first user when generating a large language model output. In this manner, the dialogue state module 364 provide further context to control the flow of dialogue with the first user.

The RAG module 366 can be configured to access the dialogue history that is stored by the dialogue state module 364. The RAG module 366 can use the dialogue history to perform contextualized retrieval of relevant facts from a knowledge base. More specifically, based on the transcribed text outputted by the listen module 354, the RAG module 366 can retrieve facts from a knowledge base that may be relevant to the speech and/or text that is provided as input by the first user. In doing so, the RAG module 366 may take the dialogue history with the first user into consideration. This may provide the RAG module 366 with context for performing search and retrieval. In some examples, the RAG module may perform search on the knowledge base and retrieve facts from the knowledge base in a manner such that the retrieved facts can be referenced back to the exact location in the knowledge base from which they are being retrieved. The knowledge base as further described herein can comprise a hierarchical tree structure comprising a plurality of nodes. The prompt generator module 367 can be configured to generate a language model prompt based (at least in part) on the retrieved relevant facts. This language model prompt generated by the prompt generator module 367 can be provided to the large language model 106 to generate a large language model output. In this manner, the language model prompt that is based on retrieved relevant facts to provide additional context to the large language model 106 can comprise reference-able information that can be referenced back to the exact location within the knowledge base.

The prompt generator module 367 can receive the retrieved relevant facts from the RAG module 366, the dialogue history from the dialogue state module 364, and portions of the language model prompts from the talk tracks module 362. The prompt generator module 367 can generate one or more language model prompts to be provided to the large language model 306 based on the retrieved relevant facts, dialogue history, and/or the portions of the language model prompts from the talk tracks module 364. For example, the prompt generator module 367 can assemble the retrieved relevant facts, the dialogue history, and/or the portions of the language model prompts to generate a language model prompt that is to be provided to the large language model 306. In this manner, the dialogue management module 360 can be configured to control a dialogue with the first user.

It should be understood that although the dialogue management module 360 is described herein as controlling a dialogue with the first user, there may be segments of the dialogue that may not be controlled by the dialogue management module 360. For instance, a dialogue with the first user may begin with an exchange of greetings, such as for example, "Hello, please let me know how I can help you?", "Hi, can I help you with a booking?", etc. Such segments of the dialogue may not be controlled by the dialogue management module 360. Instead, a language model prompt provided to the large language model 306 may include only the user input, or a stored instruction to guide the large language model 306 to generate outputs for these segments of the dialogue that are not controlled by the dialogue management module 360. Each module of the dialogue management module 360 is described in further detail below.

Talk Tracks Module

The talk tracks module 362 comprises a deterministic model comprising a plurality of states. A dialogue between the dialogue system 201 and the first user may assist the first user to accomplish a task (e.g., book a hotel room, track parcel delivery, book a restaurant table, etc.). In particular, the dialogue system 201 can support the first user and provide assistance in accomplishing the task by way of dialogue. Each state of the plurality of states of the deterministic model correspond to a one or more sub-tasks (referred to herein as a "set of sub-tasks") that can ultimately facilitate fulfilment of the task. The set of sub-tasks corresponding to a particular state relate to a specific job to be performed so that the task is accomplished. For an example task of booking a hotel room, a first set of sub-tasks may relate to a specific job of checking the membership of the first user, a second set of sub-tasks may relate to a specific job of validating the membership of the first user, a third set of sub-tasks may relate to a specific job of collecting details from the first user and looking for room availability, and so and so forth. Generally, a start state may correspond to a first set of sub-tasks to be performed so as to fulfil the task. An end state may correspond to a final set of sub-tasks to be performed so that the task is accomplished or may correspond to a change in dialogue with the first user (e.g., termination of dialogue, transfer of dialogue to a human, etc.). Given that the dialogue system 201 accomplishes the task by way of dialogue, a state of the deterministic model may be indicative of where the dialogue is during a conversation with the first user and the sub-tasks that have been accomplished so far and/or have to be accomplished so as to fulfil the task.

Each state may be associated with an identifier. For each state, other than an end state, information associated with one or more functions are stored. The one or more functions may be defined to perform a specific act that enables the fulfilment of the set of sub-tasks that correspond to that state. For example, for each state, other than an end state, one or more organized, callable, and reusable blocks of computer programs can be stored. The block of computer program(s) may comprise variables that reference data that is necessary to perform the specific act that can enable the fulfilment of the set of sub-tasks associated with that state. When the one or more functions are executed, output generated from executing the one or more functions are returned.

A change from one state to another is referred to as transition. Transition from a state is performed when a set of sub-tasks corresponding to that state is accomplished for example. Generally, transitions are performed based on knowledge that is obtained by performing the set of sub-tasks associated with that state (e.g., the state that is currently selected) and/or based on knowledge that is obtained by performing the set of sub-tasks associated with one or more states that were previously selected during the dialogue with the first user. For example, consider the example task of booking a hotel room discussed above. A first state may be associated with a set of sub-tasks that relate to checking the membership of the first user. A second state may be associated with a set of sub-tasks that relate to validating the membership of the first user. A third state may be associated with a set of sub-tasks that relate to collecting room details from the first user and checking for availability of a room. A transition from the first state may be based on the knowledge that is obtained by performing the set of sub-tasks that relate to checking the membership of the first user. Put differently, a transition from the first state may be based on whether the first user is a member or not. Similar to the first state, a transition from the second state may be based on knowledge that is obtained by performing the set of sub-tasks that relate to validating membership of the first user (e.g., based on whether the membership of the first user is valid or not). In contrast, a transition from the third state may be based on knowledge that is obtained by performing the set of sub-tasks that relate to the first state and the third state. Put differently, a transition from the third state may also be based on whether the first user is a member or not. This example is discussed in detail below.

In some examples, one or more functions associated with a state may enable a transition from that state. For instance, the one or more functions may define a transition from that state. For such states, transitions are performed when the function that defines the transition from that state is executed (e.g., by a processor, such as processor 205). In particular, for such states, transitions from the state may be based on the output of an executed function. For instance, as an example, when a function that defines a transition from an example state is executed, the execution of the function may return one of two outputs—a first output or a second output. When the function is executed and the execution of the function returns a first output, a transition may occur from the example state to a first state. When the same function is executed and the execution of the function returns a second output, a transition may occur from the example state to a second state.

Some states of the plurality of states may store a first function that defines a call to a second function. In some scenarios, the second function may define a transition from that state. For such states, when the first function is executed (e.g., by a processor, such as processor 205), the execution of the first function may cause the execution of the second function (e.g., by a processor, such as processor 205). When the second function is executed, the second function may return an output. Transition from that state may be based on this returned output.

While transitions may generally be based on knowledge that is obtained in a state that is currently selected and/or based on knowledge that is obtained in one or more states that were previously selected during a dialogue with the first user, some transitions between states may occur based on values and/or intent that is extracted by the spoken language understanding module 358. For example, the spoken language understanding module 358 may extract the first user's intent as "help needed" from input that is received from the first user. In this example, irrespective of the state in the deterministic model that is currently selected, a transition may occur to a "How can/help" state of the deterministic model. The "How can/help" state may store information that can provide help to the first user. As another example, the spoken language understanding module 358 may extract the first user's intent as "speak to a human" from input that is received from the first user. In this example, irrespective of the state in the deterministic model that is currently selected, a transition may occur to a "Transfer" state of the deterministic model. The "Transfer" state may store information to facilitate a transfer from the dialogue system to a human operator.

Therefore, a dialogue may branch into one of one or more possible dialogue pathways based on the transitions. The transitions may be based on the knowledge that is obtained in the state that is currently selected and/or knowledge that is obtained in states that were previously selected during the dialogue with the first user. Additionally or alternatively, transitions may be based on values and/or intent extracted from the inputs that are received from the first user. Accordingly, transitions define a dialogue flow. Put differently, transitions can define a direction that the dialogue is expected to take.

The deterministic model described herein can be represented as a graph. The states are nodes in the graph and the transition between the states are represented by solid arrows joining the nodes. Each state is associated with an identifier and stores state information.

Figure 7:
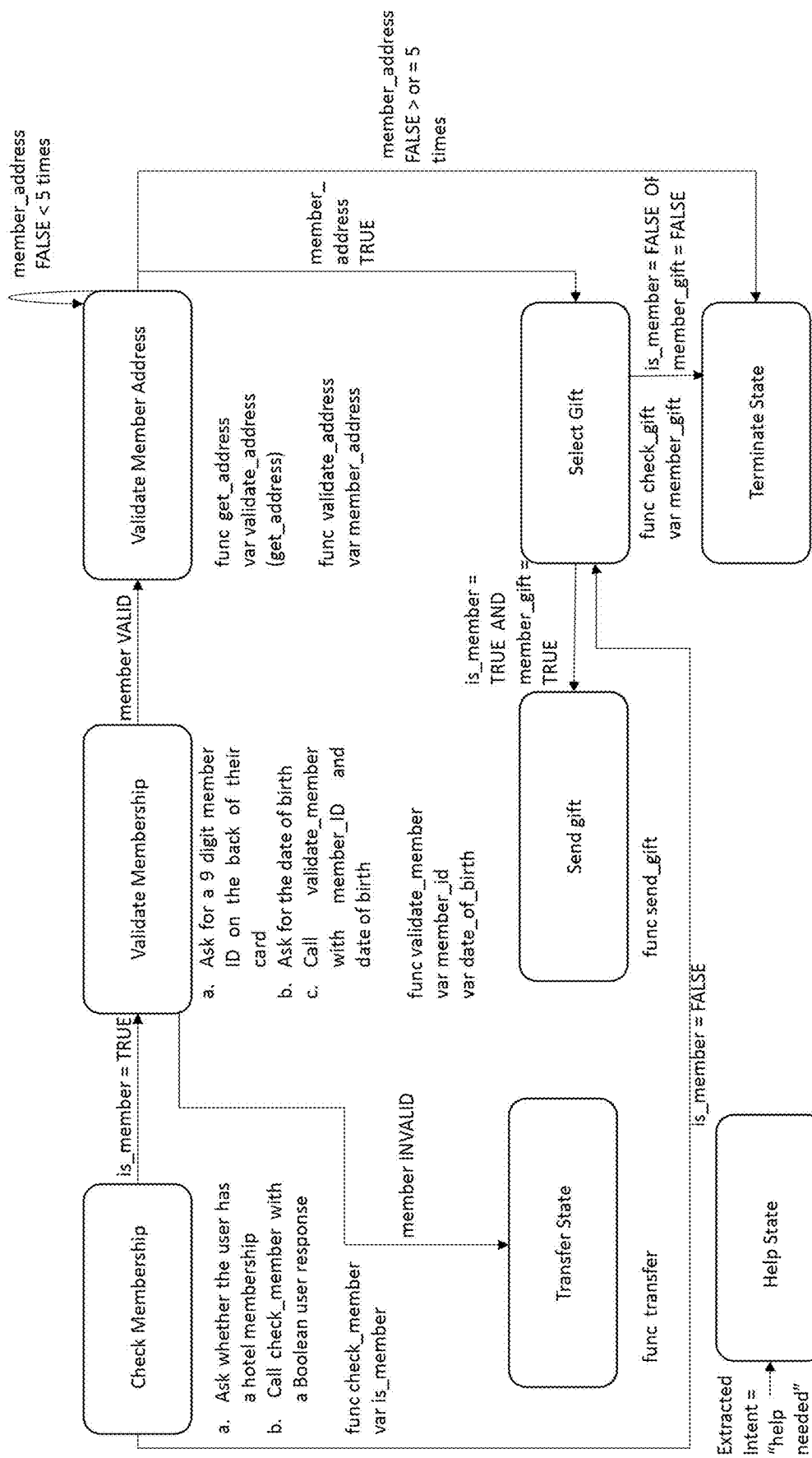
FIG. 7 shows a schematic illustration of an example deterministic model which may be used in a dialogue system according to an embodiment, depicting various information stored for some example states.

FIG. 7 shows a schematic illustration of an example deterministic model depicting various state information stored for some example states.

State Information

As seen in FIG. 7, each state includes an identifier, in this example, the identifiers are "Check Membership", "Validate Membership", "Transfer State", "Validate Member Address", "Select Gift", "Send Gift", "Help State" and "Terminate State". The states correspond to a job to be done (e.g., by way of dialogue), and comprise a portion of a language model prompt and/or a function that enable the dialogue program 200 to generate a dialogue output. In particular, for states that are not end states (e.g., "Check Membership", "Validate Membership", and Validate Member Address", "Select Gift"), the dialogue output may be based on the portion of the language model prompt and/or the function(s) stored for that state. For states that are end states (e.g., "Transfer State", "Help State", "Send Gift", and "Terminate State"), in some cases, a language model prompt or a function may not be stored for that state (e.g., "Terminate State"). Instead, some of these states themselves may define a dialogue action (i.e., a dialogue output) for the dialogue program 200 to take. For example, these states may define a dialogue action such as for example, transferring the dialogue to a human, presenting frequently asked questions to help the first user, terminating the dialogue, accessing a database, retrieving information from the database, connecting to an Application Programming Interface (API), such as third-party API, and/or the like.

Portion of a Language Model Prompt

At least some states in the plurality of states can include a portion of a language model prompt that is used by the prompt generator module 367 to generate a prompt for the large language model 306. The portion of the language model prompt associated with a state of the deterministic model can include instructions to guide the large language model 306 to generate a dialogue output. For instance, the portion of the language model prompt associated with a state may include instructions to guide the large language model 306 to generate a language model output in the form of text. Additionally or alternatively, the portion of the language model prompt associated with a state may include instructions to guide the large language model 306 to perform function calling, as further described below. More specifically, in some examples, the portion of the language model prompt may include instructions to call a function. The large language model 306 may perform function calling as described below based on such instructions. The portion of the language model prompt associated with a state may include instructions to guide the large language model 306 to output a request for a function call to perform a dialogue action (e.g., transferring the dialogue to a human, presenting frequently asked questions to help the first user, terminating the dialogue, accessing a database, connecting to a API, and/or the like).

In this example, the "Check Membership" state and the "Validate Membership" state each include a portion of a language model prompt. For instance, the "Check Membership" state includes "(a) Ask whether the user has a hotel membership, (b) Call check_member with a Boolean user response". The "Validate Membership" state includes "(a) Ask for a 9 digit member ID on the back of their card, (b) Ask for the date of birth, (c) Call validate_member with member_ID and date of birth". Similarly, the "Help State" includes a portion of a language model prompt, such as "(a) Call help_FAQ".

When a state with a portion of a language model prompt is selected, the prompt generator module 367 can generate a language model prompt based on the portion. The large language model 306 generates language model outputs based on the generated language model prompt. In this example, when the "Check Membership" state is selected the large language model 306 may ask the first user whether they have a hotel membership based on the instructions "Ask whether the user has a hotel membership." The large language model 306 may perform function calling based on the instruction "Call check_member with a Boolean user response" to trigger the execution of the function "check_member". This is described in detail below. As another example, when the "Help State" state is selected, the large language model 306 may perform function calling based on the instruction "Call help FAQ". This can trigger the execution of the function "help FAQ".

Functions

Functions are organized, callable, and reusable blocks of computer program code that are defined to perform a specific act. In some examples, the functions are programmable. For example, the functions can be modified via a second interface 352b by a second user. In particular, the talk tracks module 362 may be accessible to the second user even after the deterministic model is designed and deployed. In some instances, the second user may dynamically modify, add, and/or delete one or more functions of the deterministic model. This is described in further detail below.

In this example, the computer program code corresponding to each function is stored together with the other stored information corresponding to the corresponding state. For example, the computer program code corresponding to the "check_member" function is stored together with the other state information corresponding to the "Check Membership" (including the portion of the language model prompt). In other examples, the computer program code corresponding to all of the functions may be stored in a separate location, such as a library for example.

For some states of the deterministic model, a function that defines transition from that state is stored. In this example, for "Check Membership" state, "Validate Membership" state, and "Validate Member Address" state a respective function that defines transition from that respective state is stored. For instance, in this example, the function "check_member" defines a transition from "Check Membership" state, the function "validate_member" defines a transition from "Validate Membership" state, and the function "validate_address" defines a transition from "Validate Member Address" state. For instance, in these examples, transitions from the states may be based on the results that are returned when these functions are executed. In this example, executing "check_member" may return the variable "is_member" with value of the variable "is_member" being either "TRUE" or "FALSE". If the result returned from executing "check_member" is "is_member=TRUE", then a transition is performed from "Check Membership" state to the "Validate Membership" state. But, if the result returned from executing "check_member" is "is_member=FALSE", then a transition is performed from "Check Membership" state to the "Select Gift" state.

For states that store a function that define a transition, in some cases, such a transition may be performed after a specific result has been returned a predetermined number of times. For instance, in this example, the "Validate Member Address" state stores the function "validate_address" which defines a transition from the "Validate Member Address" state. When "validate_address" is executed, it returns the variable "member_address" with values of the variable "member_address" being either "TRUE" or "FALSE". If the result returned from executing "validate_address" is "member_address TRUE", then a transition is performed from the "Validate Member Address" state to the "Select Gift" state. However, if the result returned from executing "validate address" is "member_address FALSE", then a transition is performed only if the function "validate_address" has returned "member_address FALSE" at least 5 times before a transition from the "Validate Member Address" state has occurred. Put differently, if the "Validate Member Address" state is selected a first time, then the function "validate address" may be executed a first time. If executing the function "validate_address" returns "member_address FALSE" a first time, then a transition is not performed and the "Validate Member Address" state is selected a second time. Therefore, the function "validate_address" may be executed a second time. If executing the function "validate_address" returns "member_address FALSE" the second time, then a transition is still not performed and the "Validate Member Address" state may be selected a third time. Therefore, the function "validate_address" may be executed a third time. However, before transitioning from the "Validate Member Address" state, if executing the function "validate_address" returns "member_address FALSE" a fifth consecutive time, then a transition is performed from the "Validate Member Address" state to the "Terminate State" state. Put differently, in this case, a transition from the "Validate MemberAddress" state to the "Terminate State" state is performed if the result "member_address FALSE" is returned at least 5 consecutive times. Here, an example of "5 times" is used simply for illustrative purposes. Therefore, it should be understood that, in some cases, a transition may be performed after a specific result has been returned any suitable number of times.

Not all of these functions define a transition from a state. Some functions may generate a dialogue output in the form of text and/or speech. For instance, in this example, consider the "Help State" state. The "Help State" is selected when the spoken language understanding module 358 extracts "help needed" as the intent from the first user's input. The "Help State" state stores the function "help FAQ". The "help FAQ" function can be defined to present a list of frequently asked questions. Therefore, when the "Help State" state is selected, the "help FAQ" function may be executed (e.g., owing to the large language model 106 performing function calling as described further below). Executing the "help_FAQ" function may cause presentation of a list of frequently asked questions. Put differently, executing the "help FAQ" function may cause the talk tracks module 362 to present a list of frequently asked questions to the first user. This list may be provided to the first user via the first user interface in the form of speech and/or text.

Some functions associated with a state may generate a dialogue output in the form of a dialogue action. For instance, in this example, consider the "Transfer State" state.

The "Transfer State" state stores the function "transfer". The "transfer" function may be defined to represent an exchange with an Application Programming Interface (API) backend so as to connect the first user with a human (via the API backend). When the "Transfer State" state is selected, the "transfer" function may be executed. Executing the "transfer" function may cause the talk tracks module 362 to connect the first user to a human. Accordingly, such functions may define an exchange between the dialogue program 200 and an external program (e.g., API backend, third-party user, etc.).

Some functions associated with a state may define a function call to another function of the deterministic model. For instance, in this example, consider the "Validate Member Address" state. The "Validate Member Address" state stores two functions "get_address" and "validate_address". The function "get_address" may be defined to call the function "validate address". Therefore, executing the function "get_address" may cause the function "validate_address" to be called. More specifically, when the "Validate Member Address" state is selected, the function "get_address" may be executed. Execution of the function "get_address" may cause the function "validate_address" to be called. Accordingly, the execution of the function "validate_address" may be automatically triggered following the execution of the function "get_address".

In some examples, some functions may call further modules which perform dialogue with the user. For example, a function may call an identification and verification (ID&V) sub-module to perform identification and verification of the user. An ID&V sub-module may perform ID&V-specialised value extraction, comparison of extracted values to the reference values, and fuzzy matching and threshold-based scoring. An example identification and verification sub-module which may be used in the SLU module 358 is described in U.S. patent Ser. No. 11/861,521, incorporated herein by reference in its entirety. In some examples, the value extraction step is conducted by an LLM. Different ID&V modules may be associated with different states. For example, in a state where it is needed to conduct verification of an existing user, an ID&V routine performing full verification is call. In a state where it is only needed to perform an address check, a separate appropriate ID&V routine related to address checking is called.

Accordingly, executing a function that is stored in the deterministic model can cause the performance of a specific act that is defined by the function. For example, executing a function can cause one of: (1) a transition from a state; (2) a generation of a dialogue output in the form of text and/or speech; (3) a generation of a dialogue output in the form of a dialogue action; or (4) a calling of another function in the deterministic model. The functions that are stored in the deterministic model can be executed in one of two ways— (1) via function calling by the large language model 306 as further described below; and/or (2) via execution of another function in the deterministic model. Some functions may be defined such that they can be called via function calling by the large language model 306 and/or they can be called via execution of another function in the deterministic model. Other functions may be defined such that they can be called only via execution of another function in the deterministic model. That is, these functions cannot be called via function calling by the large language model 306.

Other State Information

Some states (e.g., states that do not comprise a portion of the language model prompt or a function) may themselves define a dialogue action. Such states are usually end states, such as, the "Terminate State" in this example. The dialogue action may include actions such as for example, transferring the dialogue to a human, presenting frequently asked questions to help the first user, accessing a database, connecting to a API, terminating the dialogue, and/or the like. More specifically, such states can represent an exchange with an Application Programming Interface (API) backend. Each of these states may be defined for expected exchange between the dialogue program 200 and an external environment, wherein the external environment may be an API backend, or a third-party user.

Transition Information

Each transition represented in the graph that depicts a deterministic model is associated with a transition identifier. In the example shown in FIG. 7, the transition identifiers are "is_member=TRUE", "is_member=FALSE" "member VALID", "member INVALID", "member_address FALSE <5 times", "member_address TRUE", "member_address FALSE > or =5 times", "is_member=TRUE AND member_gift=TRUE", "is_member=FALSE OR member_gift=FALSE", and "Extracted Intent=help needed". Transition identifiers define a direction for the flow of a dialogue. More specifically, transition identifiers define a basis on which a transition is to be performed. Each state may store information defining one or more transition identifiers.

Transition from a state may be performed after the set of sub-tasks corresponding to that state is fulfilled. As discussed above, transitions may be performed based on knowledge that is obtained in a state that is currently selected and/or based on knowledge that is obtained in one or more states that were previously selected during the dialogue with the first user. Knowledge obtained from states that were previously selected during a dialogue may be stored in the dialogue state for example. Additionally or alternatively, transitions may be performed based on values and/or intent extracted by the spoken language understanding module 358. The transition identifiers may correspond to one or more rules. For example, transitions may be defined and performed based on a set of one or more stored transition rules. Information defining one or more transition rules may be stored in one or more of the states. For example, each state may store information defining one or more transition identifiers each corresponding to a rule, such as "IF "is_member="TRUE"", THEN transition to "Validate Membership" state". The rules may be conditioned on the output of a function performed in the current state or based on the output of a function performed in a different state. The rules may be conditioned based on information that may be obtained by the SLU module 358 for example. Each transition rule associated with the current state may be assessed at each dialogue turn. One or more further transition rules that are not associated with any state may also be assessed at each dialogue turn.

In some cases, executing one or more functions stored in a state may cause knowledge to be obtained that can subsequently cause a transition from that state. In this example, the "Check Membership" state stores the function "check_member". Executing "check_member" can cause knowledge relating to the first user's membership (e.g., whether the first user is a member or not) to be obtained. The transition from the "Check Membership" state is based this obtained knowledge—i.e., based on whether the first user is a member or not a member. For example, the variable "is_member" that is included in the function "check_member" is a Boolean type variable. Therefore, there are two possible return values for the "check_member" function. These two possible return values are "is_member=TRUE" and "is_member=FALSE". Therefore, two possible transitions from the "Check Membership" state are represented in the graph in FIG. 7. Accordingly, one transition from "Check Membership" state is associated with one possible return value, i.e., "is_member=TRUE", while the other transition from "Check Membership" state is associated with the other possible return value, i.e., "is_member=FALSE". Accordingly, in such cases, transition identifiers associated with a transition from a state correspond to a possible return value of a function that defines the transition for that state. For example, the transition identifier may correspond to a rule conditioned on the possible return value of a function that defines the transition for that state.

In some cases, transitions may be based on knowledge obtained in a state that was previously selected during the dialogue with the first user. In this example, if the address of the member is valid (i.e., "member_address TRUE"), then the "Select Gift" state is selected. The "Select Gift" state stores the function "check_gift". Executing "check_gift" can cause knowledge on whether a gift is available for members to be obtained. The transition from the "Select Gift" state is based on this obtained knowledge. Additionally, the transition from the "Select Gift" state is based on knowledge obtained from the "Check Membership" state. For instance, FIG. 7 depicts two possible transitions from the "Select Gift" state. If "is_member=TRUE" (i.e., knowledge obtained from the "Check Membership" state) and "member_gift=TRUE" (i.e., knowledge obtained from the "Select Gift" state), then a transition from the "Select Gift" state to "Send Gift" state is performed. But, if "is_member=FALSE" (i.e., knowledge obtained from the "Check Membership" state) and "member_gift=FALSE" (i.e., knowledge obtained from the "Select Gift" state), then a transition from "Select Gift" state to "Terminate State" state is performed. Accordingly, in such cases, transition identifiers associated with a transition from a state correspond to possible values for a specific piece of knowledge that is obtained in that state and/or correspond to possible values for a specific piece of knowledge that is obtained in a state that was previously selected during the dialogue with the first user. In this example, the transition from the "Select Gift" state is based on both knowledge that is obtained in the "Select Gift" state and knowledge that is obtained in a state that was previously selected (i.e., "Check Membership" state). Put differently, the transition identifiers associated with transitions from the "Select Gift" state include a combination of value of a specific knowledge that is obtained in the "Select Gift" state and value of a specific knowledge that is obtained in the "Check Membership" state. It should be understood that, the transition from a state that is currently selected may be based only on knowledge that is obtained from a state that was previously selected during a dialogue with the first user. Similarly, it should be understood that, the transition from a state that is currently selected may be based only on knowledge that is obtained from that state (e.g., transitions from "Check Membership" state discussed above). Knowledge obtained from states that were previously selected during a dialogue may be stored in the dialogue state for example.

In some cases, transitions may be based on values and/or intent extracted by the spoken language understanding module 358. In this example, the spoken language understanding module 358 may extract the intent that the first user needs help from one or more inputs that are received from the first user. If the spoken language understanding module 358 extracts the intent that help is needed, a transition to the "Help State" is performed. Accordingly, in such cases, transition identifiers associated with a transition to a state correspond to possible values and/or intents that may be extracted by the spoken language understanding module 358. Such transition identifiers may correspond to transition rules that are applied at the start of each dialogue turn for example. In this manner, a transition identifier depicts a direction that a dialogue may take.

Methods Implemented by the Talk Tracks Module

The talk tracks module 362 performs one or more functions of: (a) controlling a flow of dialogue with the first user; (b) controlling a language model output from the large language model 306; (c) outputting a dialogue action; (d) enabling function calling by the large language model 306; and (e) enabling execution of a function of the deterministic model. An example method implemented by the talk tracks module 362 to perform these functions is described below.

At a high-level, the example method comprises selecting a state from the plurality of states of the deterministic model. As discussed above, a state corresponds to a job (e.g., a set of sub-tasks) that is to be done so as to aid the first user in accomplishing a task and may be indicative of where a dialogue is during a conversation with the first user. Therefore, selecting a state facilitates completion of the job corresponding to that state.

The start state of the deterministic model may be selected based on one or more pre-determined rules such as for example, natural language rules, conditional statements, a combination thereof, and/or the like.

For example, there may be a fixed Start Node which serves as a switchboard. A set of one or more transition rules may be applied at this node, conditioned on various intents. Depending on what the user wants, the system transitions to particular well-defined subflows (with their associated subflow start nodes). For instance, a system can help users with hotel bookings but can also act as a FAQ system for the hotel chain. Each conversation will always start from the same 'switchboard' node, but will transition to the first state of the booking transactional flow (which is 'Check Membership' in FIG. 9 for example) in case it is detected that the user wants to do the booking. If the user just wants to ask if there's a concierge service available, the system will transition to another state associated with this particular FAQ.

The phone number may be used as 'transition' information as well to verify implicitly if someone is a repeat caller. For example, a natural language rule may comprise parsing a phone number of the first user and determining whether the first user is a repeat caller. If the first user is a repeat caller, the natural language rule may further comprise accessing a database (e.g., the knowledge base described below) to obtain information relating to the first user. A conditional statement may comprise statements such as for example, "if information X is obtained from the database, select state Y, and if information X is not obtained from the database, select state Z".

Once the start state is selected, the job (e.g., the set of sub-tasks) associated with the start state may be performed based on a portion of a language model prompt and/or one or more functions that are associated with the start state. The selection of other states (other than the start state) in the deterministic model are based on execution of functions (and the resulting knowledge that is obtained) from a current state and/or a previous state, values and/or intent that is extracted by the spoken language understanding module 358, a combination thereof, and/or the like. Therefore, once the start state is selected, the flow of the dialogue with the first user is based on deterministic model, and in particular, on the selection of the various states in the deterministic model.

In some examples, the method further comprises generating, via the prompt generator module 367, a language model prompt. A state once selected may include a portion of a language model prompt. This portion of the language model prompt may include instructions to guide the large language model 306 to generate one or more language model outputs. The prompt generator module 367 can generate a language model prompt based on the portion of the language model prompt associated with the state. The generated language model prompt is then provided to the large language model 306 that generates language model outputs. Therefore, the outputs from the large language model 306 can be controlled by generating language model prompts based on the information that is stored in the deterministic model.

An output from the large language model 306 may be in the form of text. For instance, responsive to being provided with a generated (e.g., generated as discussed above) language model prompt—"Ask whether the user has a hotel membership", the large language model 306 may output "Sure, I can help you with that. Do you have a membership with us?" Such outputs are outputted to the first user via the first interface 352*a*.

In other cases, an output from the large language model 306 may be a request to call a function corresponding to a dialogue action. For instance, responsive to being provided with a generated (e.g., generated as discussed above) language model prompt—"Connect to API-1 to transfer the call", the large language model 306 may output a function call request to connect to API-1 to transfer the first user to another user (e.g., a human) using an application that interfaces with API-1.

In yet other cases, the output from the large language model 306 may be a structured call request that can trigger the execution of a function in the deterministic model. Such outputs are not outputted to the first user. Instead, such outputs are generated due to function calling performed by the large language model 306. In these cases (i.e., cases in which the output from the large language model 306 is a structured call request), the method further comprises determining a function to be executed based on the output from the large language model 306. In particular, the portion of the language model prompt associated with a selected state may comprise an instruction to generate a request to call to a function and the function information. The function information may include the function name and function parameters for example. The function information may comprise a JSON object comprising the structured function information. For example, in FIG. 7, consider that the selected state is the "Check Membership" state. The "Check Membership" state is associated with the portion of language model prompt—"(a) Ask whether the user has a hotel membership, (b) Call check_member with a Boolean user response" which is used by the prompt generator module 367 to generate a language model prompt. The large language model 306 may be trained to detect a call to a function based on the instructions in the generated language model prompt. In this example, based on the instruction "(b) Call check_member with a Boolean user response", the large language model may detect that the function "check_member" is to be called. The large language model 306 can output a structured call request, for example a JSON object containing arguments to call the function. This JSON object is detected by the output processing module 369 and then run in the function execution module 361. The output processing module 369 parses the output from the large language model 306 to determine if there is a request for a function call. If a request for a function call is detected, the request for the function call (for example, the JSON object) is sent to the function execution module 361. The program code corresponding to the function is then retrieved and executed, together with the function arguments specified in the request for the function call, by the function execution module 361. The output of the function is provided to the task tracks module 362. Although a separate function execution module 361 is shown here, it is to be understood that the program code corresponding to the function may be executed as part of the talk tracks module 362 for example.

In this example, the large language model 306 may output a JSON object corresponding to a function call for "check_member ("TRUE")" or "check_member ("FALSE")". The arguments for the function may be constructed based on the instructions in the generated language model prompt. In this example, the large language model 306 constructs "TRUE" or "FALSE" as the function arguments, based on whether the first user has a hotel membership (i.e., based on the content of the input from the first user which is included in the language module prompt by the dialogue state module 364). In this manner, the deterministic model described herein can enable the large language model 306 to perform function calling to trigger the execution of a function in the deterministic model.

After a function to be executed is determined (e.g., based on the output from the large language model 306), the method further comprises executing the determined function. In examples in which the function is determined based on the output from the large language model, executing the determined function can further comprise verifying the determined function (e.g., verifying an argument of the function). Verifying the argument of the function may comprise one or more of—(a) verifying whether the argument in the language model output is suitable; and (b) verifying whether the structured call request in the language model output is a premature call request.

To verify whether the argument in the language model output is suitable, the talk tracks module 362 may check the data type of the argument in the structured call request and/or may check one or more characteristics (e.g., format) of the argument in the structured call request. In the example above, the large language model 306 may output a structured call request, corresponding to "check_member ("TRUE") or "check_member ("FALSE"). To check whether the argument "TRUE" or "FALSE" is suitable, the method may check the data type of the argument to verify whether it is a Boolean. Additionally or alternatively, one or more characteristics of the argument may be verified. For instance, referring to FIG. 7, consider that the selected state is "Validate Membership" state and the large language model has outputted the structured function call corresponding to "validate_member (984466789, 19 Jul. 2001)"—where 98446679 is the member ID of the first user and 19 Jul. 2001 is the date of birth of the first user. The verification of whether the argument is suitable may include verifying that 984466789 has 9 digits (e.g., format of member ID as seen in FIG. 7), and that 19 Jul. 2001 is an appropriate date of birth.

To verify whether the structured call request is premature, the method may determine whether the function in the structured call request is associated with the selected state of the deterministic model. For example, if the selected state is "Validate Membership" state and the large language model has outputted the structured function call corresponding to "validate_member (984466789, 19 Jul. 2001)", the talk tracks module 362 may determine whether the function "validate_member" is associated with the "Validate Membership" state. Responsive to verifying that the argument is suitable and responsive to verifying that the structured call request is not premature, the method comprises executing the determined function.

However, if the function is not verified (e.g., if the argument is found to be unsuitable or if the structured call request is premature), then the method includes prompting (via the prompt generator module 367) the large language model 306 to modify the language model output (e.g., the structured call request). In particular, the method includes generating a modified language model prompt via the prompt generator module 367. The modified language model prompt may include the portion of the language model prompt that is associated with the selected state, such as for example, instruction to call a function. Generating a modified language model prompt if the function is not verified may be defined as a default behaviour in the deterministic model. For instance, some or all states of the deterministic module may be associated with another portion of a language model prompt (not shown in FIG. 7) that defines a default behaviour of the talk tracks module 362. This other portion may include instructions to guide the large language model 306 to modify the language model output if the argument is found unsuitable or if the structured call request is premature. Additionally or alternatively, some or all states of the deterministic model may store a function that defines instructions to prompt the large language model 306 to modify the language model output. The function may be executed if the argument is found unsuitable or if the structured call request is premature.

If the function cannot be verified even after generating the modified language model prompt, the talk tracks module may be designed to handle this error in a suitable manner. For instance, in some examples, a transition to a "How can I help" state or "Transfer" state may be performed. Put differently, the dialogue system may generate an output indicating that it is not possible to help the first user at this time and/or offering to transfer to a human operator. In some examples, the dialogue system may generate an output asking the first user if they want to continue the dialogue with the dialogue system concerning some other query.

The example above describes determining a function to be executed based on an output of the large language model 306. In other examples, a function that is to be executed may be determined based on an output that is obtained from executing another function in the deterministic model. For instance, a function that is to be executed may be determined based on a result that is returned from executing another function. For example, executing a first function may generate a call request to a second function, thereby determining the second function. In such examples, the determined second function can be executed (e.g., based on the call request). In some examples, when a function is executed, the talk tracks module 362 may output a dialogue action (e.g., transferring the dialogue to a human, presenting frequently asked questions to help the first user, terminating the dialogue, and/or the like).

Figure 8:
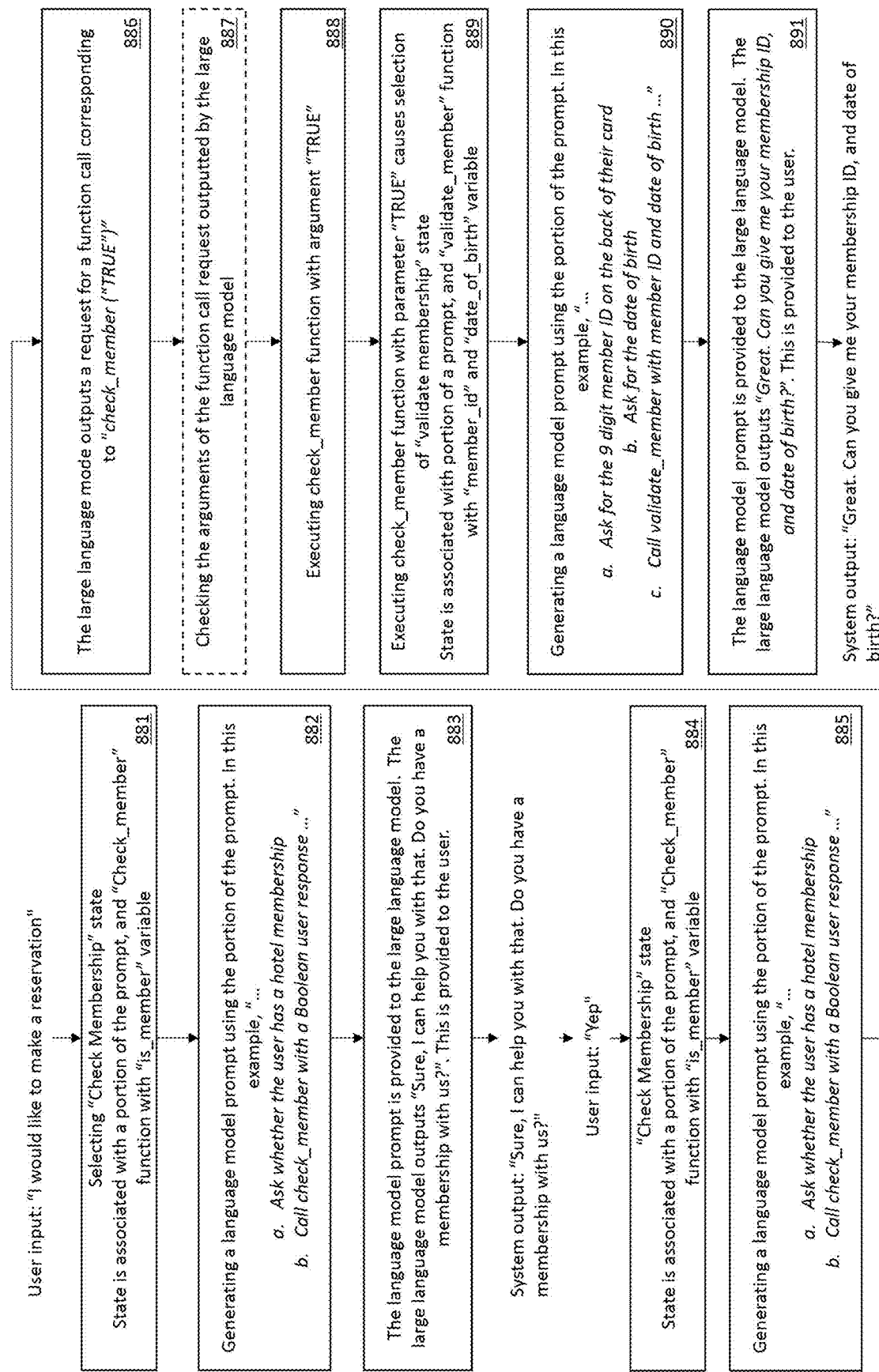
FIG. 8 shows steps that are executed from receiving an input from the first user to generating a controlled dialogue output, in a dialogue method according to an embodiment.

FIG. 8 shows steps that are executed by the talk tracks module 362 from receiving an input from the first user to generating a controlled dialogue output, according to an example. This example uses the starting two states of the deterministic model shown in FIG. 7 (i.e., "Check Membership" state and "Validate Membership" state) to describe the steps.

The dialogue program 200 receives "I would like to make a reservation" as an input from the first user. At 881, the steps include selecting "Check Membership" state from the deterministic model shown in FIG. 7. This start state is selected based on intent and/or values extracted by the spoken language understanding module 358. For example, this start state is selected based on rules such as natural language rules, conditional statements, and/or the like which are applied to the output of the listen module 354, i.e. the intent and/or values. The "Check Membership" state is associated with a portion of a language model prompt—"(a) Ask whether the user has a hotel membership, (b) Call check_member with a Boolean user response". The "Check Membership" state is also associated with the function information "check_member" with variable "is_member".

At 882, the steps include generating a language model prompt (e.g., via the prompt generator module 367) based on the portion of the language model prompt associated with the "Check Membership" state. In this example, the language model prompt that is generated may include:
general rules,
the text from the "Check Membership" state "(a) Ask whether the user has a hotel membership, (b) Call check_member with a Boolean user response",
the function information from the "Check Membership" state,
any information retrieved by the RAG module,
the dialogue history:
    "User: I would like to make a reservation.
    Agent:"

The dialogue history is included at the end of the generated language model prompt.

At 883, the generated language model prompt is provided to the large language model 306. Responsive to being provided with this generated language model prompt, the large language model 306 may output—"Sure, I can help you with that. Do you have a membership with us?" This large language model output is outputted to the first user (e.g., via the first interface 352a). One or more transition rules may be assessed at this stage, however no transition is performed (e.g. no transition rule conditions are met).

Responsive to the dialogue output "Sure, I can help you with that. Do you have a membership with us?" from the dialogue system 201, the first user may respond with "Yep". The dialogue program 200 receives "Yep" as an input from the first user (e.g., via the first interface 352a). One or more transition rules may be assessed at this stage, however no transition is performed (e.g. no transition rule conditions are met).

At 884, since no transition has been performed, the system is still in the "Check Membership" state which is associated with the portion of language model prompt—"(a) Ask whether the user has a hotel membership, (b) Call check_member with a Boolean user response" and function "check_member" with variable "is_member". At 885, a language model prompt (e.g., via the prompt generator module 367) is generated based on the portion of the language model prompt associated with the "Check Membership" state. In this example, the language model prompt that is generated may include:
any general rules,
the text from the "Check Membership" state "(a) Ask whether the user has a hotel membership, (b) Call check_member with a Boolean user response",
the function information from the "Check Membership" state,
any information retrieved by the RAG module,
the dialogue history:
    "User: I would like to make a reservation.
    Agent: Sure, I can help you with that. Do you have a membership with us?
    User: Yep
    Agent:"

The dialogue history has been updated to include the system output and second user input.

At 886, this generated language model prompt is provided to the large language model 306. Responsive to being provided with this generated language model prompt, the large language model 306 may output a structured function call request—a JSON object corresponding to "check_member ("TRUE")". This triggers the execution of the function "check_member".

At 887, the steps can optionally include, checking the arguments of the call request that is outputted by the large language model 306. In this example, the argument ("TRUE") in the call request for "check_member ("TRUE")" may be verified to confirm that the argument is suitable and that the call request for "check_member ("TRUE")" is not a premature call.

Responsive to verifying that the argument is suitable and that the call request is not premature, at 888, the steps include executing "check_member ("TRUE")". Executing this may return the result "is_member="TRUE"". At the end of step 887, the set of sub-tasks corresponding to the "Check Membership" state are performed. One or more transition rules may be assessed at this stage. The condition for a transition rule associated with the transition identifier "is_member="TRUE"" is met. At 889, a transition from the "Check Membership" state is performed based on knowledge obtained from the "Check Membership" state. In particular, at 889, the output "is_member="TRUE"" generated from executing "check_member ("TRUE")" causes the selection of the "Validate Membership" state. This state is associated with a portion of a language model prompt "(a) Ask for a 9 digit member ID on the back of their card, (b) Ask for the date of birth, (c) Call validate_member with member_ID and date of birth". This state is also associated with the function information "validate_member" with variables "member id" and "date_of_birth".

At 890, the steps include generating a language model prompt (e.g., via the prompt generator module 367) based on the portion of the language model prompt associated with the "Validate Membership" state. In this example, the language model prompt that is generated may include:
any general rules,
the text from the "Validate Membership" state—"(a) Ask for a 9 digit member ID on the back of their card, (b) Ask for the date of birth, (c) Call validate_member with member_ID and date of birth".
the function information from the "Validate Membership" state,
any information retrieved by the RAG module,
the dialogue history:
    "User: I would like to make a reservation.
    Agent: Sure, I can help you with that. Do you have a membership with us?
    User: Yep
    Agent:"

At 891, this generated language model prompt is provided to the large language model 306. Responsive to being provided with this generated language model prompt, the large language model 306 may output—"Great. Can you give me your membership ID, and date of birth?" This large language model output is outputted to the first user (e.g., via the first interface 352a). Therefore, the output system outputs—"Great. Can you give me your membership ID, and date of birth?" to the first user.

Modifying the Deterministic Model

In some examples, the dialogue system 201 provides access to the talk tracks module 362, and in particular to the deterministic model, allowing human modification of the model. The access to the talk tracks module 362 is provided via the second interface 352b. The second interface 352b may provide a web application that exposes the talk tracks module 362 (e.g., a computer program corresponding to the talk tracks module 362) through a front end. Additionally or alternatively, the second interface 352b may provide a command line interface. The web application and/or the command line interface may allow a second user (e.g., a programmer, a developer, etc.) access to the talk tracks module 362. The second user can modify portions of the deterministic model as needed. In particular, the second user can edit, add, or delete the functions that are defined in the deterministic model.

In some examples, the second user can modify (e.g., edit, add, or delete) a portion of the language model prompt that is associated with a state in the deterministic model via the second interface 352b. Additionally or alternatively, the second user can modify (e.g., edit, add, or delete) one or more functions associated with a state in the deterministic model via the second interface 352b. The modifying may be performed to fix inaccuracies or issues with the function calling mechanism (i.e., function calling performed by the large language model 306) described herein. For instance, the second user may monitor outputs from the large language model 306, and in some cases, the dialogue outputs from the dialogue system 201. If the output from the large language model 306 and/or the dialogue outputs from the dialogue system 201 are unexpected or inaccurate, then the second user may modify portions of the talk track module 362 as needed. In particular, the second user may monitor function calling performed by the large language model 306 and the structured call requests that are outputted by the large language model 306. If arguments in a specific structured call request is constructed inaccurately more than a predetermined number of times, then the second user may modify the corresponding function in the deterministic model.

As an example, consider that the "Check Membership" state in FIG. 7 is selected to generate a dialogue output. In response to a language model prompt that is generated based on the information stored in this state, assume that the large language model 306 outputs a function call request corresponding to "check_member ("42")". As discussed above, the talk tracks module 362 may check this argument and on determining that the argument "42" is unsuitable to execute the "check_member" function, the talk tracks module 362 may prompt the large language model 306 to modify the function call request. In response to a language model prompt to modify the function call, assume that the large language model 306 outputs a function call corresponding to "check_member ("36")". Assume that this process repeats and the large language model 306 repeatedly outputs a function call with inaccurate arguments. In such a scenario, the second user can modify the information associated with the "Check Membership" state via the second interface 352b. For example, the second user may modify the "check_member" and/or the variable "is_member". Additionally or alternatively, the second user may modify the portion of the language prompt associated with the "Check Membership" state.

As another example, consider that the "Check Membership" state in FIG. 7 is selected to generate a dialogue output. In response to a language model prompt that is generated based on the information stored in this state, assume that the large language model 306 outputs a function call request corresponding to "validate_member (984466789, 19 Jul. 2001)". As discussed above, the talk tracks module 362 may check this function call, detect that the function call is premature (since "validate_member" function is associated with the "Validate Membership" state), and prompt the large language model 306 to modify the function call. In response to a language model prompt to modify the function call, assume that the large language model 306 outputs a function call request corresponding to "validate_member (984466799, 14 Jul. 2001)". Assume that this process repeats and the large language model 306 repeatedly outputs the "validate_member" function call prematurely. In such a scenario, the second user can modify the information associated with the "Check Membership" state and/or the "Validate Membership" state via the second interface 352b to fix the premature function call.

Furthermore, if the task that the first user wishes to accomplish and/or if a set of sub-tasks associated with a state changes, then the second user may modify the deterministic model (e.g., one or more states) as needed. In this manner, by providing the second interface 352b, the second user can create, maintain, and improve the talk tracks module 362 as needed.

Example Deterministic Models

Figure 9:
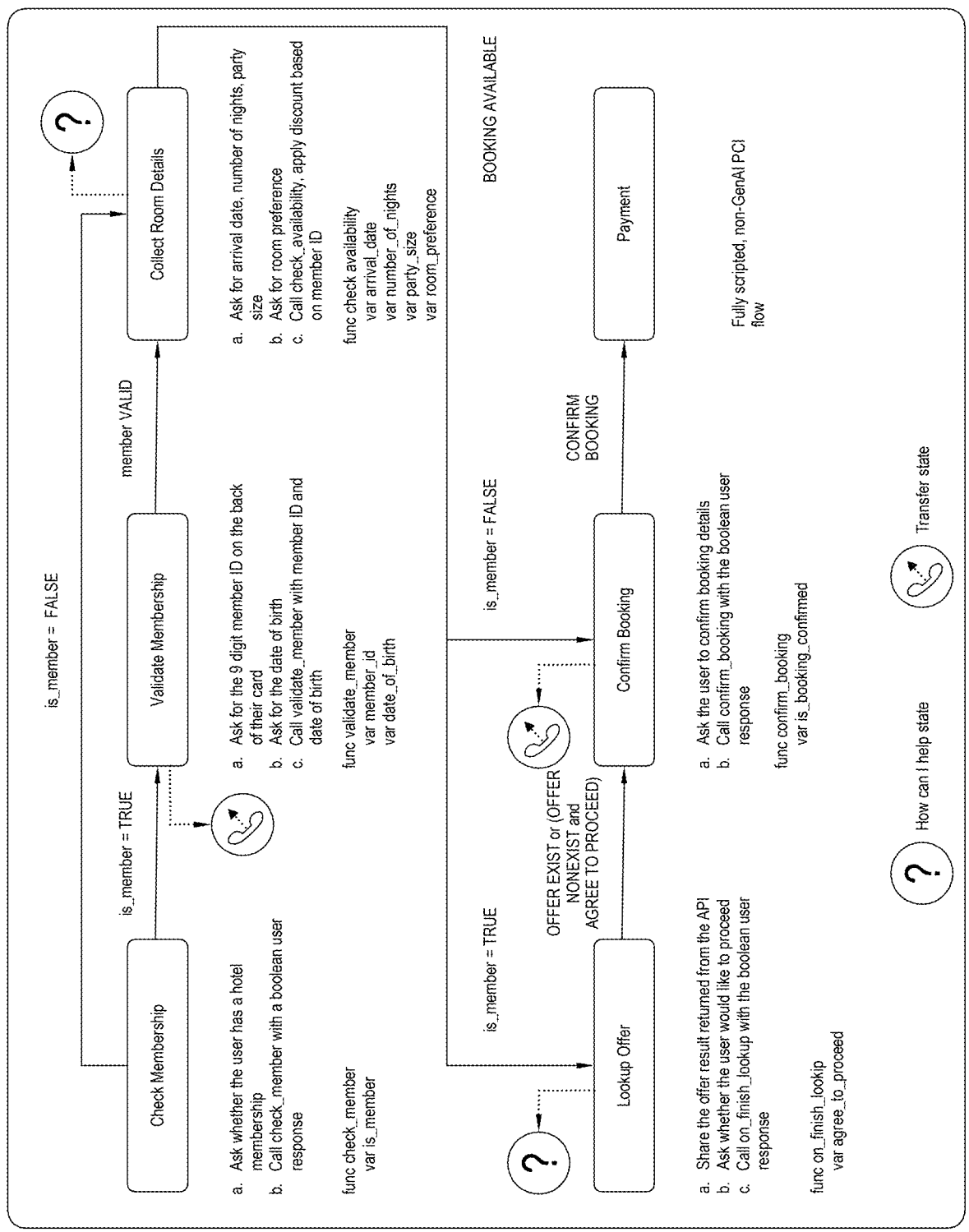
FIG. 9 shows a schematic illustration of an example deterministic model which may be used in a dialogue system according to an embodiment, for reserving a hotel.

FIG. 9 shows a schematic illustration of an example deterministic model for reserving a hotel using the dialogue system 201, according to an example. As seen in FIG. 9, the start state of this deterministic model is the "Check Membership" state that performs the sub-tasks of asking the first user whether the first user has a hotel membership and executing the "check_member" function based on the response from the first user. Executing the "check_member" function produces an output representing whether the first user has membership or not. If the first user has membership, then a transition occurs from the "Check Membership" state to the "Validate Membership" state. When the "Validate Membership" state is selected, sub-tasks associated with the "Validate Membership" state is accomplished. These sub-tasks include asking the first user for their 9 digit membership ID and their data of birth and executing the "validate_member" function based on the response from the first user. If the first user does not have membership, then a transition occurs from "Check Membership" state to "Collect Room Details" state. Executing the "validate_member" function produces an output representing whether the first user's membership is valid or invalid. If the first user's membership is valid, then a transition occurs from the "Validate Membership" state to the "Collect Room Details" state. If the first user's membership is invalid then a transition occurs from the "Validate Membership" state to "Transfer" state.

When the "Collect Room Details" state is selected, sub-tasks associated with the "Collect Room Details" state is accomplished. These sub-tasks include asking for the first user's arrival date, party size, and number of night, as well as asking the first user for their room preference. These sub-tasks also include executing the "check_availability" function. Executing the "check_availability" function produces an output representing whether a room is available or not. If a room is not available, then a transition occurs from the "Collect Room Details" state to "How can I help" state. If a room is available, then a transition from the "Collect Room Details" state is performed based on the knowledge that was obtained in the "Check Membership" state. More specifically, if the first user has membership (i.e., "is_member=TRUE"), then a transition occurs from the "Collect Room Details" state to "Lookup Offer" state. If the user does not have membership, (i.e., "is_member=FALSE"), then a transition occurs from the "Collect Room Details" state to "Confirm Booking" state. These transitions may be implemented by a transition rule that is applied to the knowledge obtained from the "check_availability" function and the "validate_member" function. This knowledge may be stored in the dialogue state for example.

When the "Lookup Offer" state is selected, sub-tasks associated with the "Lookup Offer" state is accomplished. The sub-tasks associated with the "Lookup Offer" state include sharing the offer result through an API to the first user, asking the first user whether they wish to proceed, and executing the "on_finish_lookup" function. Executing the "on_finish_lookup" function produces an output representing whether the first user has agreed to proceed with the booking or not. Transition from the "Lookup Offer" state is based on the knowledge that was obtained in the "Lookup Offer" state. More specifically, if an offer exists then a transition occurs from the "Lookup Offer" state to "Confirm Booking" state. If an offer does not exist but the first user has agreed to proceed (i.e., output produced by executing the "on_finish_lookup" function), then a transition occurs from the "Lookup Offer" state to the "Confirm Booking" state. But, if the user has not agreed to proceed (i.e., output produced by executing the "on_finish_lookup" function), then a transition from the "Lookup Offer" state to "How can I help" state is performed.

When the "Confirm Booking" state is selected, sub-tasks associated with the "Confirm Booking" state is accomplished. The sub-tasks associated with the "Confirm Booking" state include asking the first user to confirm booking details and executing the "confirm_booking" function. Executing the "confirm_booking" function produces a result representing whether the booking has been confirmed or not. If the booking has been confirmed, a transition occurs from the "Confirm Booking" state to "Payment" state. If the booking has not been confirmed, a transition from the "Confirm Booking" state to "How can I help" state is performed.

Figure 10:
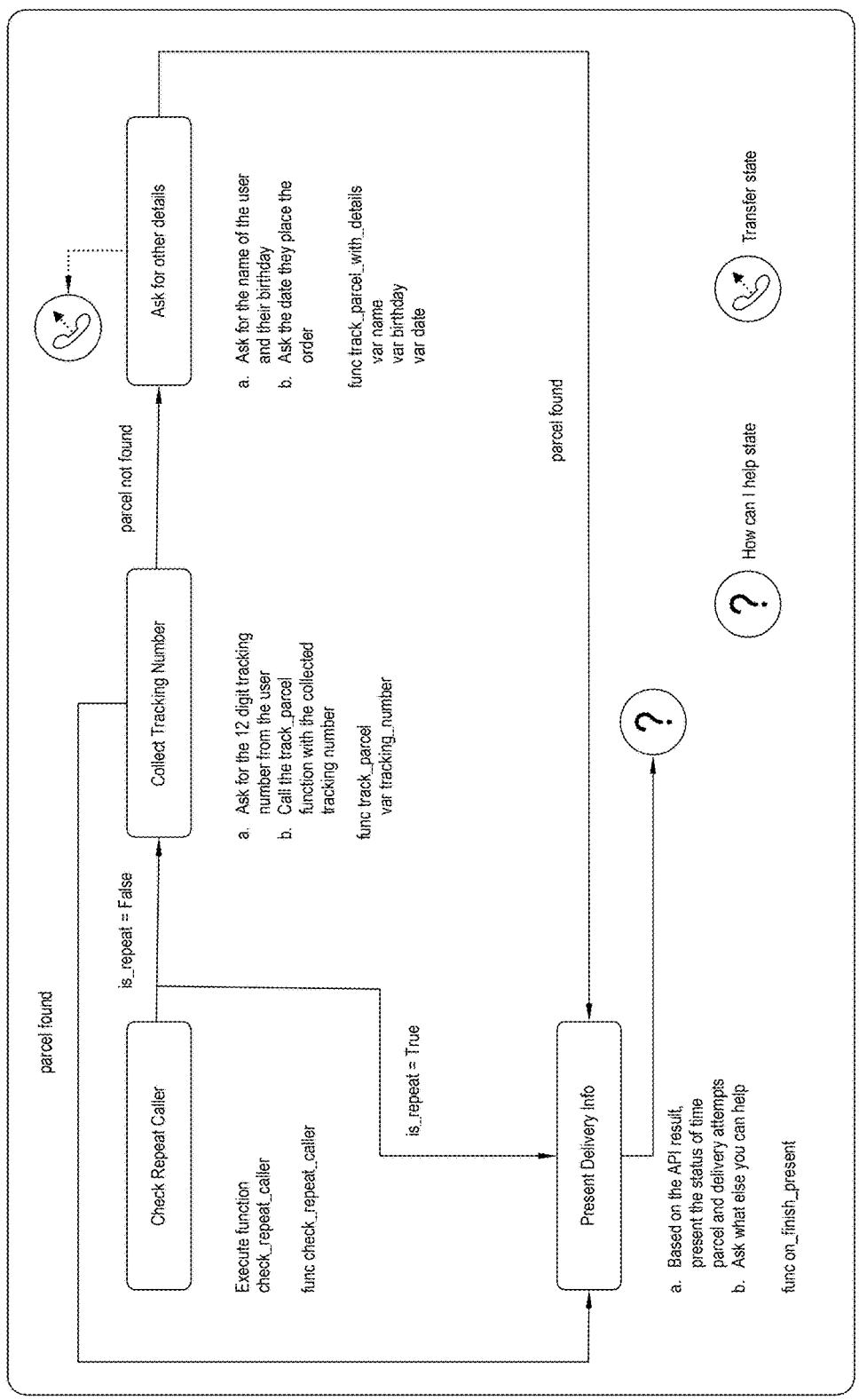
FIG. 10 shows a schematic illustration of an example deterministic model which may be used in a dialogue system according to an embodiment, for tracking delivery.

FIG. 10 shows a schematic illustration of an example deterministic model for tracking delivery (e.g., of a package) using the dialogue system 201, according to an example. As seen in FIG. 10, the start state of this deterministic model is "Check Repeat Caller" state that performs the sub-task of executing the function "check_repeat_caller". Based on the output that is generated from executing this function, the next state is selected. If the output is "is_repeat=FALSE" (i.e., the first caller is not a repeat caller), then the "Collect Tracking Number" state is selected. If the output is "is_repeat=TRUE" (i.e., the first caller is a repeat caller), then the "Present Delivery Info" state is selected.

When the "Collect Tracking Number" state is selected, the sub-tasks of asking the first user for the 12 digit tracking number and the sub-task of executing the function "track_parcel" based on the first user's response is performed. Based on the output that is generated from executing this function, the next state is selected. If the output is "parcel found", then the "Present Delivery Info" state is selected. If the output is "parcel not found", then "Ask for other details" state is selected.

When the "Ask for other details" state is selected, the sub-tasks of asking the name of the first user and their birthday, asking the date that the user placed their order, and executing the function "track_parcel_with_details" based on the first user's response is performed. Based on the output that is generated from executing this function, the next state is selected. If the output is "parcel found" then the "Present Delivery Info" state is selected. If the output is "parcel not found", then a "transfer state" is selected. The "transfer state" may transfer the dialogue to a human.

When the "Present Delivery Info" state is selected, the sub-tasks of presenting the status of the parcel and delivery attempts, asking the first user what else they need help with, and executing the function "on_finish present" based on the first user's response is performed. If the output is "help needed" (e.g., based on values and/or intent extracted by the spoken language understanding module 358), then the "how can I help you" state is selected.

Accordingly, the talk tracks module 362 comprises deterministic transitions in the dialogue flow that are programmable. These deterministic programmable transitions integrated on top of the large language model 306 may provide that the large language model 306 follows designated rules and generates controllable outputs. Put differently, the deterministic state model that is overlaid on top of the probabilistic large language model 306 allows for easier control of the probabilistic large language model 306. Each state of the deterministic model may comprise one or more of: a portion of a language model prompt; and a function that is programmable (e.g., via the second interface). The portion of the language model prompt may include instructions to guide the large language model 306 to generate controllable outputs and perform one or more of the sub-tasks that are associated with the state. In some examples, the end of the portion of the language model prompt can include instructions to perform function calling to enable execution of a function. In some examples, executing the function may enable a transition from that state. In general, transition from that state may be based on knowledge obtained in that state, and/or knowledge obtained in a state that was previously selected during the dialogue with the first user, and/or based on values or intent extracted by the spoken language understanding module 358. In general, the portion of the language model prompt associated with a state may guide the behaviour of the large language model 306 so that the job corresponding to that state is performed. The programmable function associated with a state can be modified via the second interface 350b by a second user. Each state can have a clear exit criteria to transition from that state.

The talk tracks module 362 provides several advantages. Firstly, talk tracks module 362 enables control of dialogue systems that incorporate large language models. In particular, the talk tracks module 362 reduces and/or eliminates hallucinations, harmful behaviour, and undesirable behaviour of dialogue systems that incorporate large language models. Accordingly, such dialogue systems may no longer be a complete black box to a developer and/or a programmer. Secondly, the second user (e.g., a programmer, a developer, etc.) can design how much control and rigour they want over the dialogue system. Put differently, the deterministic model can be designed based on how much control the second user may want over the dialogue system. For example, each state could be carefully created to provide fine-grained control to the second user. Alternatively, two or more states can be grouped together to provide the second user with less control over the dialogue system. Thirdly, the deterministic model can be compatible with existing technologies. For instance, the deterministic model can be integrated with existing workflows. The developers and/or programmers can continue to bias speech models based on the context of the dialogue, or continue to write metrics programmatically for generating insights following function calls. Fourthly, the talk tracks module 362 can be easy to maintain. The modular design of the deterministic model can break down the sub-tasks that are to be performed to accomplish the task in a user-friendly way. Furthermore, the modular design allows a user to visualise the various sub-tasks in an easy manner. This can lower the bar of learning to program and can make it easier to develop and maintain the talk tracks module 362.

Dialogue State Module

Referring back to FIG. 3, the dialogue state module 364 can store a dialogue state, comprising a dialogue history with the first user. For instance, the dialogue state module 364 can receive inputs that are received from the first user via the listen module 354. Additionally, the dialogue state module 364 can receive dialogue outputs that are provided to the first user from the talk tracks module 362. The dialogue state module 364 can store the inputs from the first user and the dialogue outputs provided to the first user in the dialogue state, so as to maintain the dialogue history. Knowledge obtained from execution of the functions may additionally be stored in the dialogue state. The dialogue state can be sent to the prompt generator module 367 and the prompt generator module 367 can be configured to generate a language model prompt based on the dialogue state. The dialogue state can be maintained in any suitable manner. For example, "raw" dialogue history between the dialogue system and the first user may be maintained as the dialogue state. Additionally or alternatively, the dialogue state may be maintained in a structured and/or controlled manner. For instance, the dialogue state may be maintained by storing just the inputs from the first user, by trimming the inputs from the first user to a pre-determined number of inputs, extracting values from the inputs received from the first user and storing the extracted values as structured slot-value pairs, a combination thereof, and/or the like.

Figure 14:
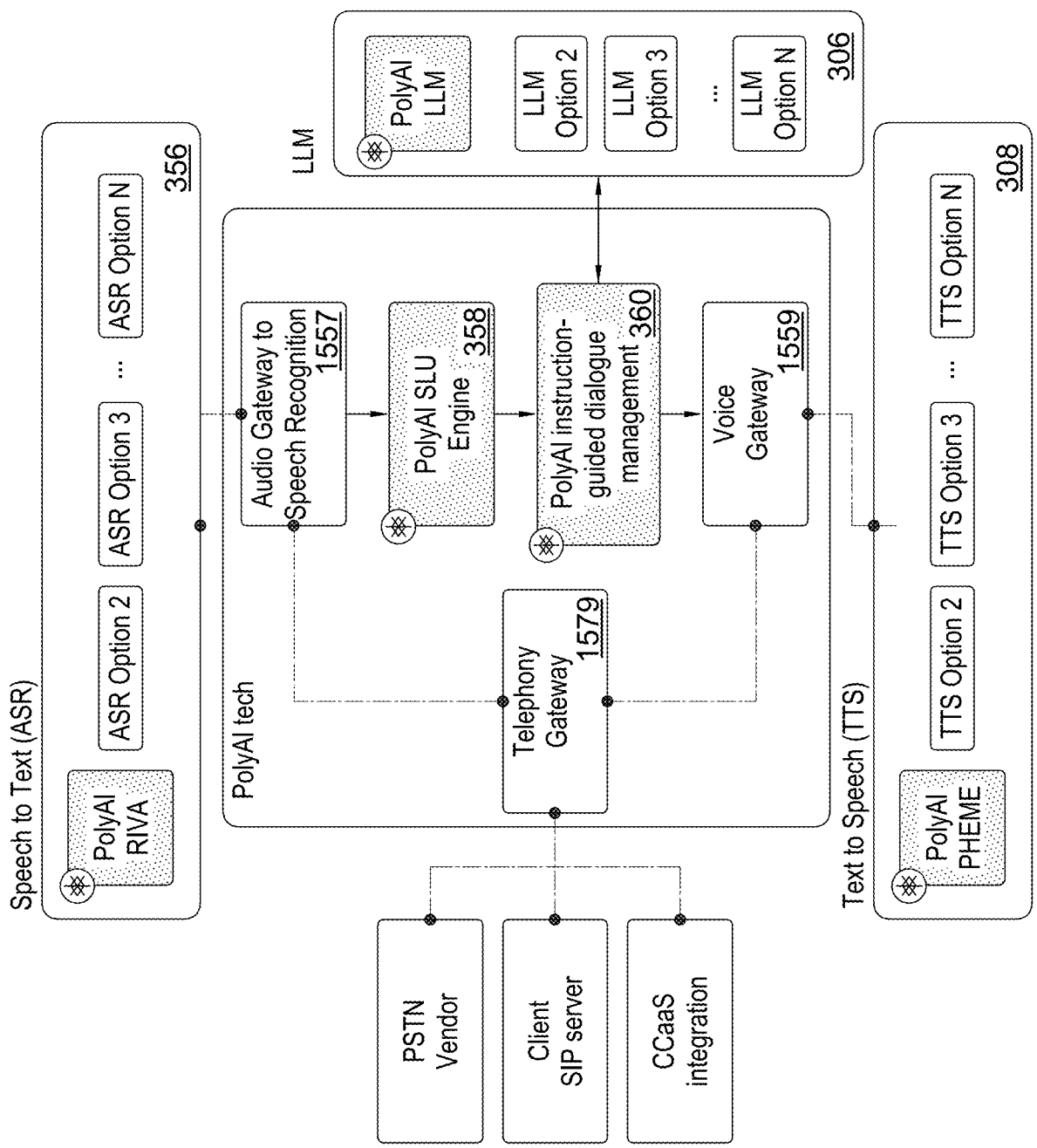
FIG. 14 shows a schematic illustration of an example integration of a dialogue system according to an embodiment.

In this example, for a given dialogue turn, the dialogue state module 364 receives the output of the listen module 354, and appends the output of the listen module to the end of the stored dialogue history, with the preface "User". (or some other term indicating that the text corresponds to the user input). An example is shown in FIG. 14, where the output of the listen module 354 is "Sure, oh, can you remind me that whether I can check-in early?". The term "Agent" is then appended on a separate line. The dialogue history is included at the end of the language model prompt, so that the final term in the language model prompt text is "Agent", prompting the large language model 306 to output the agent response. At the end of the dialogue turn, the text output to the user is appended to the end of the stored dialogue history with the preface "Agent". (or some other term indicating that the text corresponds to the dialogue system output). In this manner, the output of the listen module 354 corresponding to a given user input is included in the language model prompt.

By maintaining the dialogue state comprising the previous dialogue turns in addition to the most recent user input, the large language model 306 can be reminded of the current sub-set of tasks that the large language model is to perform so as to accomplish the task for the first user. This may also enable the large language model 306 to identify the information that may be missing in order to accomplish the task. In this manner, at every step of the dialogue, the large language model 306 may be able to look at the dialogue state to identify missing information that might be needed and the current set of sub-tasks that are to be performed.

RAG Module

The RAG Module 366 comprises a knowledge base. The RAG module 366 can be configured to perform contextualized retrieval of facts from the knowledge base. To do so, the RAG module 366 may perform search and retrieval based on the dialogue state obtained from the dialogue state module 364 or the most recent user input information output from the listen module 354.

The knowledge base included in the RAG module 366 comprises a hierarchical-tree structure. The hierarchical tree-structure comprises a plurality of RAG nodes (not to confused with "states" of the deterministic model described herein) containing data. Each RAG node is linked to one or more other RAG nodes. As with other tree structures, the knowledge base begins with a root RAG node and extends to one or more leaf RAG nodes. The root RAG node is connected to one or more children RAG nodes. Each of these children RAG nodes are connected to one or more grandchildren RAG nodes. Each of these grandchildren RAG nodes are connected to one or more great grandchildren RAG nodes, and so on and so forth. Every RAG node, except for the root RAG node has exactly one parent. Before the execution of the dialogue program 200 (e.g., by the processor 205), the connection/link between the various RAG nodes may be pre-defined. One or more RAG nodes may be dynamically added to the hierarchical tree-structure during or after the execution of the dialogue program 200 as further described herein.

Each RAG node represents a topic. Every child RAG node that extends from a parent RAG node represents a sub-topic of the topic in the parent RAG node. For example, if a parent RAG node represents the topic "parking", every child node that extends from this parent RAG node may represent a sub-topic of "parking", such as for example, "self-parking", "oversized", "price-regular rates"", etc. While many RAG nodes contain data relating to a specific topic, some RAG nodes may not contain data. For example, the "parking" node may not contain data. However, the "self-parking" node may contain the text data "We have complimentary self-parking for registered guests at the hotel". Our self-parking garage is located on the south side of the hotel on $1^{st}$ street and Bridger". The "oversized" node may contain the text data "We have some open parking for oversized vehicles on Main and East Carson Avenue, behind out main self-parking garage". The "price-regular rates" node may contain the text data "Parking cost for non-hotel guests without qualified parking validations, regular rate is $50 per car per day".

The knowledge base may be designed to retrieve information (e.g., relevant facts) that may not be an exact match to a search query but may be similar to the search query. Additionally or alternatively, the knowledge base may be designed to retrieve information even if the inputs from the first user is ambiguous. In one example, the knowledge base may be designed such that RAG nodes that relate to a similar topic may be at a same level in the hierarchical tree-structure. For example, consider a parent RAG node that represents the topic "hotel". A child RAG node that extends from this parent RAG node may be "timings". A child RAG node "timings" extending from a "restaurant" RAG node and the child RAG node "timings" extending from the "hotef" RAG node may be at the same level in the tree structure. Thus, the knowledge base data structure may allow the RAG module 366 to retrieve information (e.g., relevant facts) that may not be an exact match to a search query but may be similar to the search query.

Figure 11:
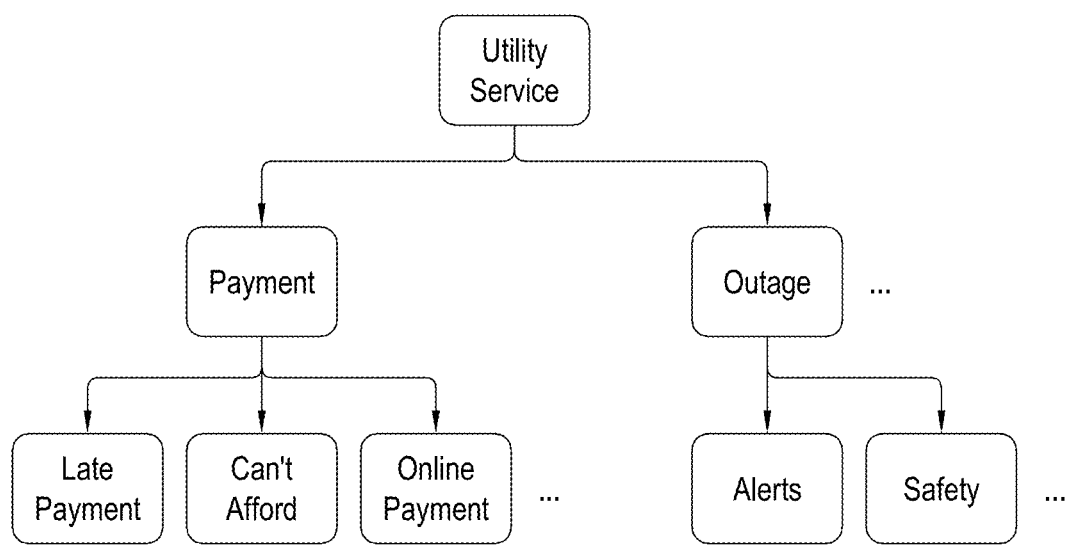
FIG. 11 shows a schematic illustration of a knowledge base for a utility service which may be used in a dialogue system according to an embodiment.

FIG. 11 shows a schematic illustration of a knowledge base for a utility service, according to an example. As seen in FIG. 11, the root RAG node is "utility service" and may include data relating to the "utility service". The "utility service" RAG node has two children RAG nodes "payment" and "outage". The "payment" and "outage" nodes share a parent node "utility service". "Payment" may include data relating to payment due date, late payment fee, overdue amount, link to pay a bill online, phone number to pay a bill, and/or the like. "Outage" may include data relating to outages, such as for example, alerts to be provided when there is an outage, safety information for when there is an outage, and/or the like. In this example, the "outage" node has two children RAG nodes "alerF" and "safety". "Payment" node has three children RAG nodes "late payment", "can't afford", and "online payment". As an example, the node path utility service"—"Payment"-"late payment" may include knowledge such as for example, if the bill is not paid by the payment statement due date on the invoice, then a payment reminder post may be sent including the overdue amount and the late payment fee. If the payment cannot be made by the due date, this node path may also include a phone number to provide assistance to find a solution.

Figure 12:
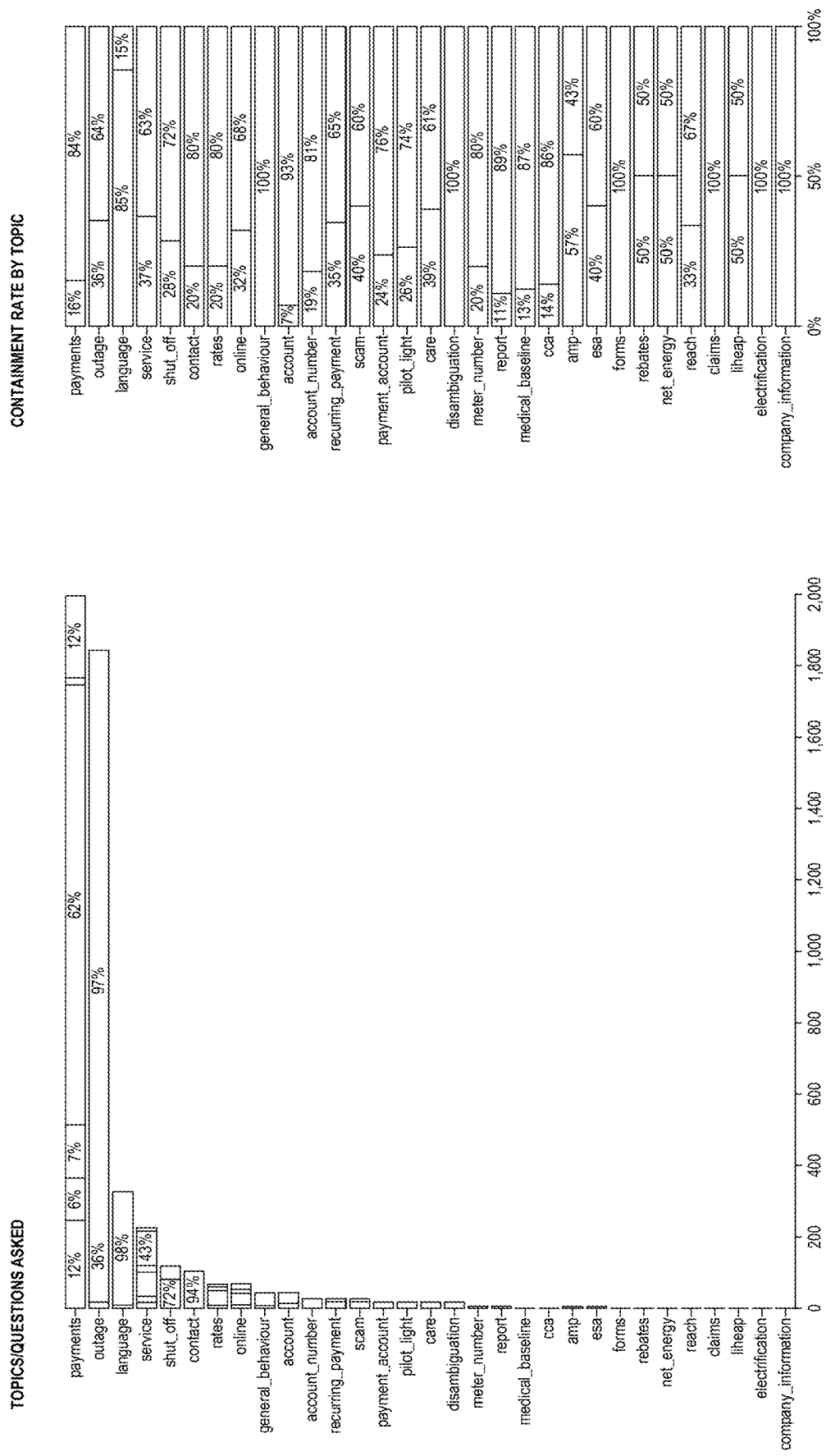
FIG. 12 illustrates an example dashboard generated by the RAG module, which may be used in a dialogue system according to an embodiment.

In some examples, the knowledge base may be constructed based on an unstructured database. For example, the knowledge base may be a structured composition of the unstructured database. The knowledge base can thus provide interpretable paths and can be used to provide intent-based analytics as shown in FIG. 12.

The RAG nodes and the associated data are encoded into a vector database. Accordingly, relevant facts can be retrieved from the knowledge base using the vector encodings of the RAG nodes, or the associated data, or both. The vector database may be stored in the storage 207. In particular, for each RAG node, the text corresponding to the topic is encoded into a knowledge base vector embedding by an embedding model. The vector embedding comprises one or more vectors corresponding to the topic text. The vector embedding is stored in a vector database together with an identifier of the RAG node. The embedding model may be any suitable embedding model that can be used for search and retrieval. For example, the embedding model can be a model as described in LLM2Vec: Large Language Models are Secretly Powerful Text Encoders, to BehnamGhader et al. (https://arxiv.org/pdf/2404.05961), incorporated herein by reference in its entirety. In some examples, the embedding model may be a model dedicated to perform efficient search and retrieval. For example, the embedding model may be a model that is evaluated on the Massive Text Embedding Benchmark (MTEB) benchmark. In some examples, the embedding model may be a sentence-level embedding model and/or a document-level embedding model. An embedding model may be selected based on the size, efficiency, and retrieval performance of the model. Some non-limiting examples of the embedding model include gte-large-en-v1.5 (https://huggingface.co/Alibaba-NLP/gte-large-en-v1.5), gte-Qwen2-1.5B-instruct (https://huggingface.co/Alibaba-NLP/gte-Qwen2-1.5B-instruct), Universal AnglE Embedding (https://huggingface.co/WherelsAI/UAE-Large-V1), bge-large-en-v1.5 (https://huggingface.co/BAAI/bge-large-en-v1.5), and/or the like.

When an input from the first user is received at the RAG module 366, the RAG module 366 can encode the input from the user into an input vector embedding, i.e. a vector generated by the embedding model from the text output by the listen module 354. In some examples, the dialogue history, including the most recent input, is encoding into the input vector embedding and used by the RAG module to retrieve the information from the knowledge base. In other words, the text output from the dialogue state module 364 is encoded by the embedding model to generate the input vector embedding. The RAG module 366 can then apply a similarity function between the input vector embedding and each of the knowledge base vector embeddings to determine the top L most relevant nodes that relate to the input from the first user (or to the dialogue history where this is used to generate the input vector embedding), where L is a positive integer greater than or equal to 1 and is pre-defined. The similarity function may be a semantic similarity function, a lexical similarity function, or a combination of both. For example, a cosine similarity between the two vector embeddings may be used. In this manner, the RAG module 366 may be configured to perform non-parametric search and retrieval of relevant facts that relate to an input from the first user. The text data that is associated with the L nodes is retrieved from the knowledge base and included in the language model prompt by the prompt generation module 367.

In some examples, the tree structure can be used to retrieve additional information in cases where the dialogue system has failed to adequately respond to the first user. The dialogue management module 360 may detect that the dialogue system has failed to respond to the first user in different ways. For example, if a state that is selected remains unchanged but the first user is asked to repeat an information, if function calling discussed above has failed, if there are discrepancies between inputs from the first user and the current state, etc. For example, one or more predetermined rules can be run on the user input to detect potential discrepancies between the input and the current state of the dialogue. Where the dialogue management module 360 detects that the dialogue system has failed to adequately respond to the first user, the RAG module 366 generates the input vector embedding as previously. The RAG module 366 determines the top L most relevant nodes as previously. However, the RAG module 366 then determines if there are any additional nodes included on the same branch as any of the top L most relevant nodes. Nodes are included on the same branch if they have the same parent node. For example, in the tree structure shown in FIG. 11, the "Late payment" node and "Can't afford" node are included on the same branch as the "Online payment" node. The "Outage" node is included on the same branch as the "Payment" node. Thus if the "Online Payment" node is returned in the list of top L nodes, the "Late payment" node and "Can't afford" node are determined as being on the same branch as one of the retrieved nodes. The "Outage" node, "Alerts" node and "Safety" node are not returned as they are not on the same branch as the "Online Payment" node (i.e. they do not share a parent node with the "Online Payment" node). The text data corresponding to the top L nodes, and the nodes determined as being on the same branch (i.e. sharing a parent with) one of the top L nodes is retrieved and included in the language model prompt by the prompt generation module 367. By including this additional information in the language model prompt, the language model output is more likely to adequately respond to the user.

The data associated with each of the RAG nodes are reference-able data owing to the hierarchical tree structure. Therefore, relevant fact or data that is retrieved from the knowledge base can be referenced back to the exact position in the hierarchical tree-structure from which it has been retrieved. Thus, outputs from the large language model 306 that use retrieved data from the RAG module 366 can be fact checked. In particular, the data that is retrieved from the RAG module 366 can be used by the prompt generation module 367 to generate a language model prompt. Therefore, outputs generated by the large language model 306 responsive to being provided with the generated language model prompts that include data that is retrieved from the RAG module 366 can be fact checked because the relevant fact can be easily looked up in the knowledge base. In some examples, if the outputs generated by the large language model 306 are inaccurate or undesirable outputs, then the knowledge base may be restructured as needed to provide better outputs. In some examples, the data retrieved from the RAG module 366 may be stored and maintained (e.g., cached) in the dialogue state module 364. Accordingly, if the dialogue with the user requires this retrieved data, the data may be simply be retrieved from the dialogue state without the need to search the knowledge base of the RAG module 366 again.

In some examples, owing to the structure of the improved database, the RAG module 366 can automatically generate insights from the contextual information (e.g., intent) that was used for search and retrieval. The RAG module 366 can generate a dashboard, such as for example shown in FIG. 12, that shows what the users of the dialogue system 201 are asking about. The dashboard may display the topics (e.g., intent) as well as the sub-topics that are defined in the knowledge base.

Prompt Generator Module

The prompt generator module 367 can receive the dialogue state from the dialogue state module 364, portions of the language model prompts from the talk tracks module 362, and retrieved relevant facts from the RAG module 366. The prompt generator module 367 can assemble a language model prompt (e.g., on-the-fly) based on the portions of the language model prompt, the dialogue state, and the retrieved relevant facts. The language model prompt generated by the prompt generator module 367 is provided to the large language model 306.

FIG. 13 illustrates an example language model prompt generated by the prompt generator module 367. In this example, the language model prompt is generated to guide the large language model 306 to book a reservation. As seen in FIG. 13, part 1451 of the generated language model prompt comprises portions of language model prompts that are associated with the deterministic model of the talk tracks module 364 including information corresponding to functions of the deterministic model (e.g., JSON objects). The deterministic model considered in this example is the deterministic model in FIG. 9. The portions of the language model prompts associated with the "Check Membership" state, "Validate Membership" state, and "Collect Room Details" state are assembled as part 1451. Part 1452 of the language model prompt includes relevant facts retrieved from the RAG module 366. In this example, 1452 includes facts related to parking at the hotel. Part 1453 of the language model prompt comprises dialogue history with the first user until the current time point. Part 1451, part 1452, and part 1453 are assembled together to generate the language model prompt. The language model prompt is automatically generated by the prompt generator module 367 using information from the talk tracks module 362, dialogue state module 364, and RAG module 366. In this example, the language model prompt also includes a set of general rules. These correspond to stored text that is automatically included at the start of every language model prompt by the prompt generator module 367.

Although in this example, the prompt generator module uses the dialogue state from the dialogue state module 364, portions of the language model prompts from the talk tracks module 362, and retrieved relevant facts from the RAG module 366 to generate the language model prompt, it should be understood that in other examples, the prompt generator module 367 may use only the dialogue state, only the portions of the language model prompts, or only the retrieved relevant facts to generate the language model prompt. In yet other examples, the prompt generator module 367 may use a combination of dialogue state and portions of the language model prompt, a combination of dialogue state and retrieved relevant facts, or a combination of portions of the language model prompt and retrieved relevant facts to generate the language model prompt.

Safety Guardrails Module

The language model prompt generated by the prompt generator module 367 can be further processed by the safety guardrails module 368 before the prompt is provided to the large language model 306. The safety guardrails module 368 comprises one or more trained models to implement prompt injection protection. More specifically, language model prompts may be prone to attacks. The attack may involve the first user provided the user input to manipulate or inject malicious content to the language model prompt. Prompt injection protection can prevent such prompt injection attacks. The trained models of the safety guardrails module 368 may be trained to implement preflight prompt checks, improve the robustness of the language model prompts, and/or detect prompt injections. This may provide prompt injection protection.

Additionally or alternatively, the safety guardrails module 368 can implement one or more filters to filter input from the first user. The filters may be configured to classify the input from the first user, standardize the input from the first user, normalize the input from the first user, etc. It should be readily understood that data that is transferred in between the module of the dialogue system are encrypted and adhere to data retention policies.

Large Language Model

The large language model 306 is a computational model that can implement natural language understanding and natural language processing capabilities. The large language model 306 is a generative model. This large language model 306 can include a transformer architecture (e.g., a transformer encoder, a transformer decoder, etc.), one or more attention layers, one or more recurrent layers, and one or more embedding layers. The large language model 306 can be pre-trained to encode input (e.g., input in the form of speech or text) that the model 306 receives, and generate output predictions (e.g., predicting the next word or next token) so as to perform a language task.

In this example, the large language model 306 is a generative general-purpose large language model that is trained on extensive datasets to perform a wide range of language tasks. For example, the large language model 306 can be pre-trained on diverse datasets such as for example, text from the Internet, so as to perform a wide range of language tasks (e.g., generate human-like text, answer questions, compose emails, summarize passages, create content in various styles and formats, etc.). Various large language models that are known and can be used as the large language model 306, such as for example, generative pre-trained transformer (GPT) models (e.g., ChatGPT that was developed by OpenAI™, Google® Gemini, Anthropic® Claude 3, Mistral or Mixtral series).

In some examples, two or more language models may be used by the dialogue system. For example, a first language model which is a larger model, for example comprising a larger number of trained parameters, and a second language model, which is a smaller model, for example comprising a smaller number of trained parameters. The second language model may be fine-tuned for the specific intended domain. In other words, an additional supervised fine-tuning training stage may be performed with the second language model compared to the first language model, using training data that is specific to the intended domain (for example hotel booking). The prompt generator module 367 may determine whether each prompt should be provided to the first or second language model. For example, the prompt generator module 367 may receive information from the talk tracks module 362 indicating whether to provide the prompt to the first or second language model, where each state in the talk tracks module is associated with the first or second language model. In this way, latency may be reduced, since the system uses the second, smaller, model where possible to respond to the user query.

Speak Module

The speech module 308 can process the text generated by large language model 306 and synthesize the text to speech. Accordingly, the speech module 308 comprises a text-to-speech generator. The text-to-speech generator can be any suitable text-to-speech generator such as for example, Google® TTS, Amazon® TTS, ElevenLabs, play.ht, StyleTTS, etc. In some alternative examples, the large language model 306 generates a language model output in the form of speech.

In some examples, the speak module 308 may comprise a text-to-speech generator that is pre-trained and/or fine-tuned for the specific intended domain (e.g., hotel booking, etc.) of the dialogue system. Such speak module 308 may be based on non-autoregressive decoding. For example, the speak module 308 may comprise a model that uses parallel non-autoregressive decoding as described in "PHEME: efficient and conversational speech generation", to Budzianowski et al. (https://arxiv.org/pdf/2401.02839.pdf), incorporated herein by reference in its entirety. As another example, the speak module may comprise a model that implements diffusion process such as for example the model described in "StyleTTS 2: Towards Human-Level Text-to-Speech through Style Diffusion and Adversarial Training with Large Speech Language Models", to Li et al. (https://arxiv.org/pdf/2306.07691). Such domain specialized models may be smaller in size than other existing models and may be trained and optimized to improve efficiency and reduce latency.

Integration of Modules of the Dialogue System

FIG. 14 shows a schematic illustration of the integration of a dialogue system described herein, according to an example. The speech recognition module 356 may be any suitable speech recognition module, such as for example, ASR models provided by Google®, Amazon®, Deepgram®, a combination thereof, and/or the like. Additionally or alternatively, the speech recognition module 356 may be as described herein. The speech recognition module 356 may be communicably coupled to the spoken language understanding module 358 via gateway 1557. The spoken language understanding module 358 is described above. The spoken language understanding module 358 interfaces with the dialogue management module 360 described above. The dialogue management module 360 is communicably coupled to a speak module 308 via gateway 1559. The speak module 308 may comprise any suitable text-to-speech generator such as for example, Google® TTS, Amazon® TTS, ElevenLabs, play.ht, StyleTTS, etc. The dialogue management module 360 may be integrated with a large language model 206. The large language model may be any suitable large language model such as for example, OpenAI® GPT models, Google® Gemini, Anthropic® Claude 3, Mistral or Mixtral series, etc.

While one or more modules described herein may be processed sequentially, in some examples, two or more modules described herein may be processed in parallel manner. For instance, referring back to FIG. 3, in some examples, the talk tracks module 362 and the RAG module 366 may be implemented at a same time in a parallel manner. For example, given a user input, the talk tracks module 362 may be implemented to determine a dialogue action while the RAG module 366 may be implemented in parallel to extract relevant details relating to the user input.

Enumerated Examples

A computer-implemented method of controlling an output from a dialogue system, the method comprising:
  receiving, by way of an input, first input data relating to speech or text provided by a user;
  extracting, based at least in part on the first input data, an intent of the user;
  searching a hierarchical tree data structure for data associated with the extracted intent, wherein the hierarchical tree data structure comprises a plurality of nodes with pre-defined connections, each node of the plurality of nodes representing a topic, wherein searching comprises searching for a topic in the plurality of nodes that is identical or similar to the extracted intent;
  determining a node from the plurality of nodes based on the searching;
  selecting data associated with the node;
  retrieving the data from the node;
  generating a language model prompt based on the retrieved data;
  providing the language model prompt as input to a language model to generate a language model output; and
  outputting, by way of an output, speech or text to the user based on the language model output.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made.

The invention claimed is:

1. A computer-implemented method of controlling an output from a
  dialogue system, the method comprising:
  receiving, by way of an input, first input data relating to speech or text provided by a user;
  selecting a first state from a plurality of states of a deterministic model, at least some states of the plurality of states being associated with a corresponding portion of a language model prompt including an instruction to call a corresponding function;

responsive to the first state being associated with a corresponding portion, generating a first language model prompt comprising at least part of the corresponding portion associated with the selected first state;
providing the first language model prompt as input to a language model to generate a first language model output;
determining whether to execute a function based on the first language model output;
responsive to determining to execute a first function based on the first language model output, executing the determined first function to generate a first function output;
selecting, based at least in part on a knowledge obtained during a dialogue with the user and based on the first function output, a second state from the plurality of states;
responsive to the second state being associated with a corresponding portion of a language model prompt, generating a second language model prompt comprising at least part of the corresponding portion associated with the selected second state;
providing the second language model prompt as input to the language model to generate a second language model output;
determining whether to provide an output to the user based on the second language model output; and
responsive to determining to provide an output to the user based on the second language model output, outputting, by way of an output, speech or text to the user;
responsive to outputting the speech or text to the user based on the second language model output, receiving, by way of the input, second input data relating to speech or text provided by the user;
after receiving the second input data, selecting a state from the plurality of states, wherein the selected state is the second state;
generating a third language model prompt comprising at least part of the corresponding portion associated with the selected second state;
providing the third language model prompt as input to the language model to generate a third language model output;
determining whether to execute a function based on the third language model output;
responsive to determining to execute a second function based on the third language model output, executing the determined second function to generate a second function output; and
selecting a third state from the plurality of states based on the second function output.

2. The computer-implemented method of claim 1, wherein the at least some states further comprise information identifying the corresponding function, wherein executing the determined first function further comprises:
verifying an argument of the first function based on the first language model output and the information identifying the corresponding function associated with the selected first state; and
responsive to determining that the argument is verified, executing the determined first function to generate the first function output.

3. The computer-implemented method of claim 2, further comprising:
responsive to determining that the argument is not verified, generating a modified first language model prompt comprising at least part of the corresponding portion associated with the selected first state and providing the modified first language model prompt as input to the language model to generate a modified first language model output.

4. The computer-implemented method of claim 1, wherein selecting the first state comprises:
applying at least one pre-determined rule to the first input data; and
selecting the first state based on the application of the at least one pre-determined rule.

5. The computer-implemented method of claim 1, wherein executing the determined second function to generate the second function output comprises:
executing an initial second function to generate an initial second function output;
determining a third function based on the initial second function output; and
executing the determined third function to generate the second function output.

6. The computer-implemented method of claim 1, the method further comprising:
responsive to the third state being associated with a corresponding portion of a language model prompt, generating a fourth language model prompt comprising at least part of the corresponding portion associated with the selected third state;
providing the fourth language model prompt as input to the language model to generate a fourth language model output;
determining whether to execute a function based on the fourth language model output;
responsive to determining to execute a third function based on the fourth language model output, executing the determined third function to generate a third function output;
selecting the third state from the plurality of states based on the third function output;
generating a fifth language model prompt comprising at least part of the corresponding portion associated with the selected second state; and
providing the fourth language model prompt to the language model to generate a fifth language model output.

7. The computer-implemented method of claim 1, further comprising:
responsive to the third state being associated with a corresponding portion of a language model prompt, generating a fourth language model prompt comprising at least part of the corresponding portion associated with the selected third state;
providing the fourth language model prompt as input to the language model to generate a fourth language model output;
determining whether to execute a function based on the fourth language model output; and
responsive to determining to execute a third function based on the fourth language model output, executing the determined third function to generate a third function output, wherein executing the determined third function causes the dialogue system to perform a dialogue action.

8. The computer-implemented method of claim 7, wherein the dialogue action comprises at least one of transferring the user to a human operator or terminating a dialogue with the user.

9. The computer-implemented method of claim 7, wherein the dialogue action comprises at least one of accessing a database or connecting to an Application Programming Interface (API).

10. The computer-implemented method of claim 1, the method further comprising:
   storing the first input data and the first language model output as a dialogue history with the user.

11. The computer-implemented method of claim 10, wherein the second language model prompt further comprises the dialogue history with the user.

12. The computer-implemented method of claim 1, the method further comprising:
   storing the first input data, the first language model output, the second language model output, and the second input data as a dialogue history with the user.

13. The computer-implemented method of claim 12, wherein the third language model prompt further comprises the dialogue history with the user.

14. The computer-implemented method of claim 1, the method further comprising:
   querying, based on the first input data, a knowledge base data structure to retrieve information, wherein the first language model prompt further comprises the retrieved information.

15. The computer-implemented method of claim 12, the method further comprising:
   querying, based on the dialogue history with the user, a knowledge base data structure to retrieve information, wherein the first language model prompt further comprises the retrieved information.

16. The computer-implemented method of claim 14, wherein the knowledge base data structure comprises a hierarchical tree structure comprising a plurality of nodes, each node of the plurality of nodes representing a topic or a subtopic.

17. The computer-implemented method of claim 16, wherein querying further comprises:
   identifying, based on a similarity matching of the dialogue history with the user with each of the plurality of nodes, one or more nodes from the plurality of nodes; and
   responsive to identifying the one or more nodes, retrieving, from the identified node, the information to be included in the first language model prompt.

18. The computer-implemented method of claim 16, wherein querying further comprises:
   determining whether any nodes from the plurality of nodes share a parent node with any of the identified one or more nodes; and
   retrieving, information from any nodes determined to share a parent node with any of the identified one or more nodes to be included in the first language model prompt.

19. The computer-implemented method of claim 1, the method further comprising:
   extracting, via a spoken language understanding module, an intent from the second input data; and
   selecting the third state based on the extracted intent, wherein the spoken language understanding module comprises a neural network.

20. A dialogue system, comprising:
   a first input configured to receive first input data and second input data relating to speech or text provided by a user;
   a first output configured to provide speech or text to the user; and
   one or more processors, configured to:
      select a first state from a plurality of states of a deterministic model, at least some states of the plurality of states being associated with a corresponding portion of a language model prompt including an instruction to call a corresponding function;
      responsive to the first state being associated with a corresponding portion, generate a first language model prompt comprising at least part of the corresponding portion associated with the selected first state;
      provide the first language model prompt as input to a language model to generate a first language model output;
      determine whether to execute a function based on the first language model output;
      responsive to determining to execute a first function based on the first language model output, execute the determined first function to generate a first function output;
      select, based at least in part on a knowledge obtained during a dialogue with the user and based on the first function output, a second state from the plurality of states;
      responsive to the second state being associated with a corresponding portion of a language model prompt, generate a second language model prompt comprising at least part of the corresponding portion associated with the selected second state;
      provide the second language model prompt as input to the language model to generate a second language model output;
      determine whether to provide an output to the user based on the second language model output; and
      provide speech or text to the user based on the second language model output responsive to determining to provide the output to the user;
      after receiving the second input data in response to providing the speech or text to the user based on the second language model output, select a state from the plurality of states, wherein the selected state is the second state;
      generate a third language model prompt comprising at least part of the corresponding portion associated with the selected second state;
      provide the third language model prompt as input to the language model to generate a third language model output;
      determine whether to execute a function based on the third language model output;
      responsive to determining to execute a second function based on the third language model output, execute the determined second function to generate a second function output; and
      select a third state from the plurality of states based on the second function output.

21. The system of claim 20, wherein the one or more processors is further configured to execute a first module configured to process the first input data, a second module configured to convert input speech data to text data, and a third module configured to generate speech from the second language output.

22. A non-transitory computer readable storage medium comprising computer readable code configured to cause a computer to perform a method comprising the following operations:
   selecting a first state from a plurality of states of a deterministic model, at least some states of the plurality of states being associated with a corresponding portion of a language model prompt including an instruction to call a corresponding function;

responsive to the first state being associated with a corresponding portion, generating a first language model prompt comprising at least part of the corresponding portion associated with the selected first state;

providing the first language model prompt as input to a language model to generate a first language model output;

determining whether to execute a function based on the first language model output;

responsive to determining to execute a first function based on the first language model output, executing the determined first function to generate a first function output;

selecting, based at least in part on a knowledge obtained during a dialogue with the user and based on the first function output, a second state from the plurality of states;

responsive to the second state being associated with a corresponding portion of a language model prompt, generating a second language model prompt comprising at least part of the corresponding portion associated with the selected second state;

providing the second language model prompt as input to the language model to generate a second language model output;

determining whether to provide an output to the user based on the second language model output; and responsive to determining to provide an output to the user based on the second language model output, outputting, by way of an output, speech or text to the user;

responsive to outputting the speech or text to the user based on the second language model output, receiving, by way of the input, second input data relating to speech or text provided by the user;

after receiving the second input data, selecting a state from the plurality of states, wherein the selected state is the second state;

generating a third language model prompt comprising at least part of the corresponding portion associated with the selected second state;

providing the third language model prompt as input to the language model to generate a third language model output;

determining whether to execute a function based on the third language model output;

responsive to determining to execute a second function based on the third language model output, executing the determined second function to generate a second function output; and selecting a third state from the plurality of states based on the second function output.

* * * * *